(12) United States Patent
Orifici et al.

(10) Patent No.: US 7,853,463 B2
(45) Date of Patent: Dec. 14, 2010

(54) METHOD AND SYSTEM TO ASSESS, TRACK AND IMPLEMENT CAPITAL PROJECTS BY MUNICIPALITIES

(75) Inventors: Joseph Michael Orifici, South Salem, NY (US); William Von Fabrice, Lincolndale, NY (US); Dudley Hare, Jr., Garrison, NY (US); Matthew Jared Orifici, Scarsdale, NY (US); Micah Justin Orifici, Waccabuc, NY (US); Randall Dygert, Mt. Kisco, NY (US); Vincent Beni, Briarcliff Manor, NY (US)

(73) Assignee: Capital Projects Software, LLC, Hawthorne, NY (US)

( * ) Notice: Subject to any disclaimer, the term of this patent is extended or adjusted under 35 U.S.C. 154(b) by 1534 days.

(21) Appl. No.: 11/107,363

(22) Filed: Apr. 16, 2005

(65) Prior Publication Data

US 2005/0251433 A1    Nov. 10, 2005

Related U.S. Application Data

(60) Provisional application No. 60/563,170, filed on Apr. 16, 2004.

(51) Int. Cl.
*G06F 17/30* (2006.01)
(52) U.S. Cl. ............................................. 705/7; 705/9
(58) Field of Classification Search ....................... 705/9
See application file for complete search history.

(56) References Cited

U.S. PATENT DOCUMENTS

| 6,675,127 | B2 * | 1/2004 | LaBlanc et al. | 702/181 |
| 6,873,961 | B1 * | 3/2005 | Thorpe et al. | 705/7 |
| 7,330,822 | B1 * | 2/2008 | Robson et al. | 705/9 |
| 7,747,457 | B2 * | 6/2010 | Cullen et al. | 705/9 |
| 7,788,118 | B1 * | 8/2010 | Vahee et al. | 705/7 |

FOREIGN PATENT DOCUMENTS

WO   WO 9904370   *   1/1999

OTHER PUBLICATIONS

Davies, "Primary Consultant Options for Capital Projects Planning: A Market Analysis and Selection Methodology", May 2004, Massachussets Institute of Technology, Pages.*
"Project Evaluation Guidelines", Dec. 1997, Queensland Surgery, pp. 1-22.*
Pakkala ("Innovative Project Delivery Methods for Infrastructure", Dec. 2002, Finish Road Enterprise, pp. 1-122.*
Budget and Successful for Small Capital-Capacity Projects, Dec. 2002, J.Mgmt. Engrg. vol. 18, Issue 4, pp. 186-193.*

* cited by examiner

*Primary Examiner*—Romain Jeanty
(74) *Attorney, Agent, or Firm*—Gottlieb, Rackman & Reisman, P.C.

(57) ABSTRACT

A computer-based organizing, planning, implementing and tracking system is provided, the system is more particularly directed to a tracking method and system to assist municipal clients in organizing planning, implementing and tracking events and expenditures of capital projects.

14 Claims, 15 Drawing Sheets

METHOD AND SYSTEM TO ASSESS, TRACK AND IMPLEMENT CAPITAL PROJECTS BY MUNICIPALITIES

This application claims the priority date of Apr. 16, 2004, U.S. Provisional Patent Application No. 60/563,170, entitled "Method and System for Management of Capital Projects by Muncipalities.

BACKGROUND OF THE INVENTION

Discussion of the Background

Capital projects are very difficult to manage efficiently. This is due in large part to the fact that presently, the organization, planning, implementing and tracking of such capital projects is a manual process without the benefit of a central data warehouse to track project related information. This results in a failure to maximize reimbursement from state or federal agencies as well as an increased risk of exposure for damage claims and the opportunity for fraudulent activities by staff. These issues ultimately result in increased costs. Other drawbacks of organizing, planning, implementing and tracking such projects via manual means include non-centralized information, limited or non-existent daily, monthly and annual audit data and controls, a lack of end-to-end vision of the project, loosely defined methods and practices which vary significantly from community to community, an inefficient use of staff time, and computer systems that only provide annual financial reports regarding vendors and contracts. These systems do not carry multi-year project history records, resulting in a manual operation to generate vendor histories.

In view of the foregoing considerations, there is a need to assess, track, and implement capital projects to guarantee the successful management of capital funds and further provide project management controls that maintain quality and performance and assist in formulating and tracking the budget.

SUMMARY OF THE INVENTION

With the foregoing in mind, the present invention advantageously provides a computerized system to assist municipal clients in organizing, planning, implementing and tracking capital projects. In particular, the computerized system of the invention provides a centralized automated solution to capital project administrative requirements by (a) centralizing, from a central data warehouse, financial management, risk management, and project management, (b) reporting to appropriate municipal and government audiences, and (c) providing a centralized data base for the municipal client and consultants to work upon, report and review project records.

The present invention encompasses, in one of its aspects, an assessment, valuation and tracking method to assist municipal clients in organizing, planning, implementing and tracking capital projects. The method includes: (a) financial tracking, consisting of monitoring the existence of bond funds, the investment of the same, the disbursement of the same to vendors, budget reports to the municipal entity and budget forecasting, (b) administrative practice controls, setting forth the statutory and municipal duties and responsibilities of each municipal employee and auditor, (c) risk management, including monitoring of required liability insurance policies, performance labor and material bonds, vendor liens, and claims, and (d) project management, including monitoring of actual project requirements, such as reporting to government authorities, performance reports, change order tracking and project requirements per each vendor.

The present invention encompasses, in another of its aspects, a system to assist municipal clients in organizing, planning, implementing and tracking capital projects. The system comprises one or more of the following tools: (1) a Capital Projects Planning and Reporting Tool ("CPPRT"), containing an administrative practice module, a risk management module, and a financial management module, (2) a Capital Asset Reporting Tool ("CART"), containing a building inventory system, space utilization data, building population data, building assessments, five year capital projects plan, and building floor plans, (3) a Fixed Asset Planning Reporting Tool ("FAPRT"), containing inventory of all furniture, fixtures and equipment and replacement cost valuation of same, (4) a Technology Asset Planning and Reporting Tool ("TAPRT"), containing inventory of all data systems, computers, software licenses, hardware equipment, cabling and switching for LAN and replacement cost valuation of same, and (5) a Security Asset, Planning, Reporting Tool ("SAPRT"), containing inventory of all security systems, hardware equipment, cabling and monitoring devices and replacement cost valuation of same as well as GPS coordination and interfaces with EMS, Police and Fire Departments.

Each of these tools represents a stand alone system and can be used separately by a municipality.

BRIEF DESCRIPTION OF THE DRAWINGS

Some of the features, advantages, and benefits of the present invention having been stated, and others will become apparent as the description proceeds when taken in conjunction with the accompanying drawings in which.

DEFINITIONS

Figure 1:
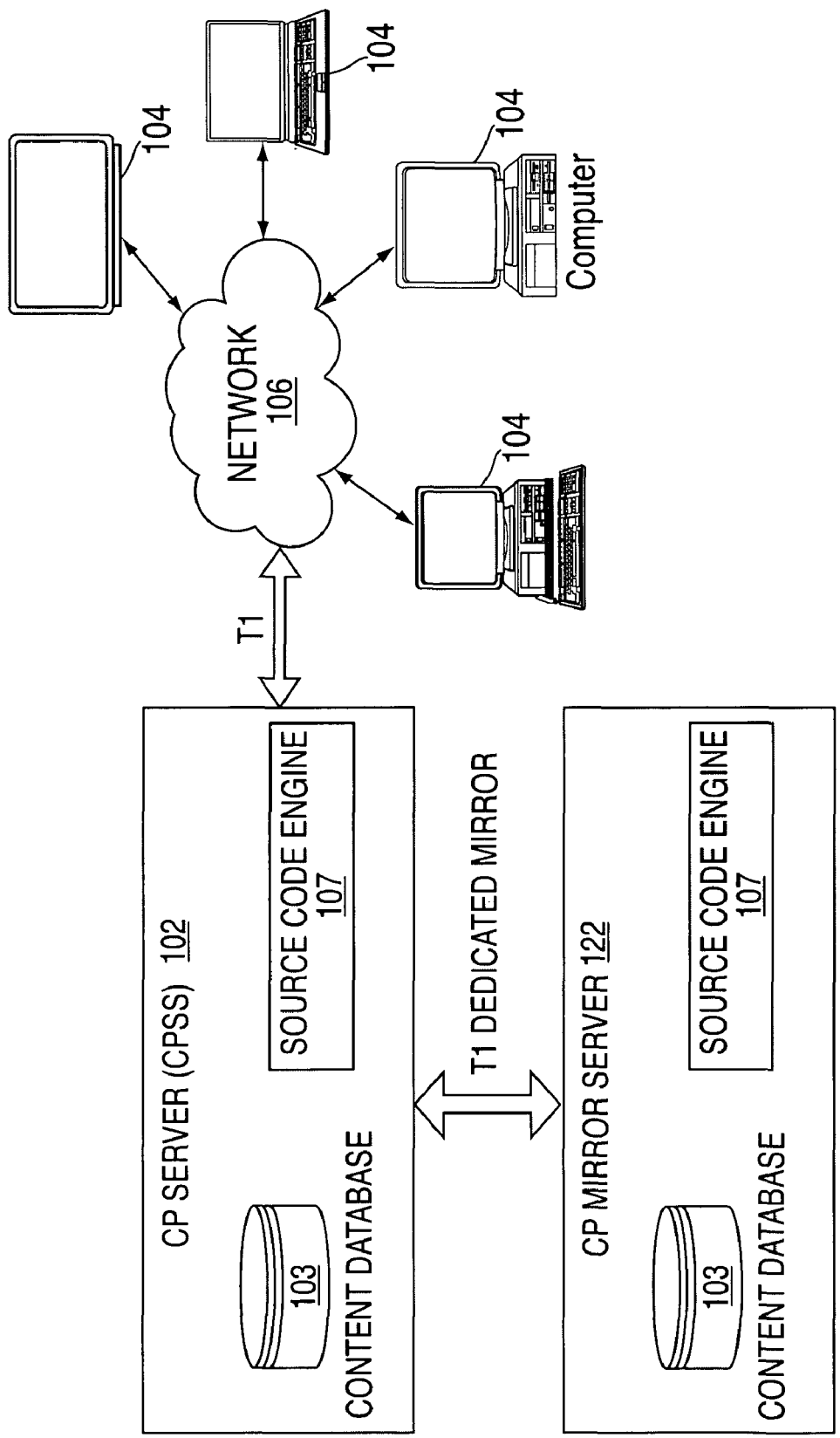
FIG. 1 is a is a block diagram that illustrates a capital projects management system in accordance with a preferred embodiment.

When the following terms are used herein, the accompanying definitions apply:

Client—an information device and/or process running thereon that requests a service of another information device or process running thereon (a "server") using some kind of protocol which accepts the server's responses. A client is part of client-server software architecture. For example, a computer requesting the contents of a file from a file server is a client of the file server.

Database—one or more structured sets of persistent data, usually associated with software to update and query the data. A simple database might be a single file containing many records, where the individual records use the same set of fields. A database can comprise a map wherein various identifiers are organized according to various factors, such as identity, physical location, location on a network, function, etc.

Executable application—code or machine readable instructions for implementing predetermined functions including those of an operating system or other information processing system, for example, in response to a user command or input.

Executable procedure—a segment of code (machine readable instruction), sub-routine or other distinct section of code or portion of an executable application for performing one or more particular processes and may include performing operations on received input parameters (or in response to received input parameters) and provide resulting output parameters.

Information—data

Network—a coupling of two or more information devices for sharing resources (such as printers or CD-ROMs), exchanging files, or allowing electronic communications there-between. Information devices on a network can be physically and/or communicatively coupled via various wireline or wireless media, such as cables, telephone lines, power lines, optical fibers, radio waves, microwaves, ultra-wideband waves, light beams, etc.

Processor—a processor as used herein is a device and/or set of machine-readable instructions for performing tasks. As used herein, a processor comprises any one or combination of hardware, firmware, and/or software. A processor acts upon information by manipulating, analyzing, modifying, converting or transmitting information for use by an executable procedure or an information device and/or by routing the information to an output device. A processor may use or comprise the capabilities of a controller or microprocessor.

Repository—a memory and/or a database.

Object—as used herein comprises a grouping of data, executable instructions or a combination of both or an executable procedure.

Server—an information device and/or software that provide some service for other connected information devices via a network.

User interface—a tool and/or device for rendering information to a user and/or requesting information from the user. A user interface includes at least one of textual, graphical, audio, video, animation, and/or haptic elements.

A/R—Accept or reject by government authority

AE—Architect—The architect chosen by the municipality to design the building or addition.

BO—Business Official—Individual chosen to organize and implement the capital project by the municipality (Board of Education, School District, and/or Superintendent)

BOE—Board of Education—Members of the Board of Education are typically citizens of the community elected for specific terms and responsible for overseeing all functions of the school district.

CM—Construction Manager—Individual selected by the municipality/school district to manage the capital project Core Planning Team—The team in charge of initially discussing and preparing the capital project, comprising one or more of the following individuals: the Business Official, one or more members of the Board of Education, the Superintendent or a designee, another School District designee, or any other person from the community.

DEC—Department of Environmental Conservation—governmental authority on the State level which in New York State exists to: "conserve, improve, and protect its natural resources and environment, and control water, land and air pollution, in order to enhance the health, safety and welfare of the people of the state and their overall economic and social well being."

CPS Exception Report An internal control tool for the CapProSoft™ user to identify missing data or nonaligned data required by the municipal government or other government agency LOI—Letter of Intent—initial document from the municipality to the governmental authority outlining the scope of the capital project RFP—Request for Proposal—Business Official prepares for approval of municipality (Board of Education, School District, and/or Superintendent) a form (the "Request for Proposal") containing the request for a proposal for the particular capital project from the insurance broker, or the attorney, or the architect, or the construction manager, or the computer vendor, depending upon the capital project at issue Project Team—The team in charge of the capital project. The team may consist of the Business Official, one or more members of the Board of Education, the Superintendent or a designee, another School District designee, the architect or a designee, the construction manager or a designee Central Office—The office designated by the School District, Board of Education and/or the Superintendent as the coordinator and repository for documents regarding the capital project Municipality—A division of a state for establishing and conducting governance.

School District—A division of a town or city for establishing and conducting schools.

SED: State Education Department: The division or department of the particular state authority responsible for all education-related projects.

SO: Superintendent's Office

Substantial Completion: form prepared to notify municipality or government agencies that capital project is now complete Superintendent—The individual chosen by the Board of Education to be in charge of the School District

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will fully convey the scope of the invention to those skilled in the art.

The present invention provides a solution to the needs described above through a system and method to assist municipal clients in organizing, planning, implementing and tracking capital projects.

The Capital Project Software (CapProSoft™) system provides a unique, automated approach to assist municipal public clients in organizing, planning, implementing and tracking capital projects by providing a centralized automated and integrated series of solution to capital project administrative requirements. In particular, the CapProSoft™ system centralizes, from a central data warehouse, the financial management, risk management, project management and reporting of capital project expenditures to appropriate audiences in a timely fashion. In this manner, the successful management of capital assets is more assured as compared with prior art manual approaches.

Core product capabilities of the CapProSoft™ product include:

Internet Product/Service ASP architecture

Permits for migration path for future modules

Interfaces with standard web browsers (Internet Explorer 4.0 or higher)

Access protection for data and product; users can be added at different levels of access Secure site with access only to permitted users with passwords Visibility and accessibility can be via an internet or intranet connection Retrieves supporting knowledge from Internet or Intranet site(s) quickly and efficiently (i.e., URLs, FTP Servers, etc.)

Integrates with standard Microsoft Office software (including Microsoft Office)

Web based Graphical User Interface

Automated Plugin enhancements: Services and Product.

Provides rapid archiving/recovery from archive of project data

Provides rapid access of all archived documentation

Provides project financial tracking reporting as part of the application

Data import and export feature

Capable of rapidly accommodating electronic interfaces with other data provider systems Designed to operate with Microsoft standard e-mail and web services, such as Outlook Express and Internet Explorer Adapted to automatically produce State and Federal reporting forms The invention provides a number of advantages over prior art systems most of which contribute towards providing capital project management control procedures to guide end users in meeting project timelines and deadlines. More particularly, the CapProSoft™ system provides a core strategy for the successful implementation of a municipal capital project, including:

a report tracking and monitoring of all elements of a capital project, comprehensive capital project budget control tools project management controls to assure project performance by team members a centralized data warehouse of project information readily accessible information to be provided to federal, state agencies and local government and community representatives maintaining an informed community by providing information in required reporting formats asset management controls designed with and administered by a governing body financial reports over a project period in a multi-year format financial reports that update to an annual budget good practice guidelines for administrative teams a resource data base of vendors user friendly reports including: addresses and required forms of governmental agencies charged with project approval, such as change/revision control, project initiation, progress and finalization, Project Performance reports key tracking reports of state and federal requirements a database containing skills of existing employees to eliminate outsourcing requirements, project control features that limit owner risk, quality control/quality assurance parameters that allow for realization of end vision reduction in staff expense maximizing reimbursement from state, federal and local governments management (insurance tracking, claims control)

procurement and procedure policy control (established by local government)

exception based reporting (identifying missing information from government forms)

five (5) year capital planning tool resulting in five (5) year building plan comprehensive building conditions assessment of deficiencies facilities assessment and report card facilities communication tool by a web based portal with interactive home page for posting of public reports annual visual inspection update to comprehensive assessment space utilization reports demographic reports by area or building replacement cost and life cycle analysis for all assets both fixed and tangible More specific advantages include the following First, with regard to the financial reporting, the invention is capable of providing the following financial reports: (1) Letter of Intent to the government agency, (2) Payments by Vendor, (3) Payments by Category, (4) Payments by Period, (5) Contract Status, (6) Purchase Order Status, (7) Pending Change Orders, (8) Outstanding Change Orders, (9) Final Reports, (10) Audit History of Project Expenditures; (11) Final Project Cost Inputs; (12) Project Directories; (13) Building Conditions Report; (14) Five (5) Year Building Plan; (15) Tangible Asset Inventory; (16) Space Utilization, and (17) Security and Communication Reports for Emergency Preparedness.

Second, with regard to policy considerations, the CapProSoft™ system is designed so that the municipality is the central repository for project information. In this regard, the municipality can input certain criteria, procedures and policies, called pre-sets. In one embodiment, a pre-set check is made prior to accepting further input of any such criteria, procedures or policies. The system will not permit entry of information if it contradicts the pre-set criteria, procedures or policies. This feature also enables the CapProSoft™ system to help the user perform all Accept/Reject (A/R) functions. If the particular documents contain data which is not in compliance with the pre-sets, the CapProSoft™ system will automatically issue a rejection. Manual systems are incapable of performing this function.

Third, no process can continue forward unless the necessary governing agency applications (which are generated by the CapProSoft™ system) have been filled out and/or approved. An initial interview is conducted with the municipality to generate a required checklist of official forms, directed towards establishing project policy. The system is configured to generate a report identifying any exceptions in the pre-set policies.

Fourth, no financial action can be undertaken without a preset monetary policy established by the municipality which is then input into the CapProSoft™ system. The initial interview will also focus upon setting this preset policy. The system will generate reports identifying exceptions in the preset policies. The input of the preset financial policy is designed to govern the system's ability to process payments.

Fifth, no financial action can be taken without a preset risk management policy established by the municipality and inputted into the CapProSoft™ system. The risk management policy can be established by the municipality on its own or with assistance from the CapProSoft™ system during the initial interview and in subsequent interviews. Deficiencies in the preset risk management policy will be identified by the system so that corrections can be made by the municipality.

System Overview

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

FIG. 1 is a block diagram that illustrates a capital projects management system 100 in accordance with the preferred embodiment. System 100 includes at least one Capital Projects Software (CPS) server 102 which is mirrored or duplexed at mirror (CPS) server 122. An advantage of this configuration is that if the (CPS) server 102 fails, then the system 100 can enable access to its own local mirror CPS server 122. The system further includes one or more client devices 122. Intermediate devices such as gateways, routers, and other such types of network devices may be used to assist client device 104 and CPS server 102 in communicating over network(s) 106. Thus, each user at a client device 104 can by way of an appropriate browser or the like thereon interact with the CPS server 102. Intermediate devices, additional CPS servers, and additional client devices are not shown in the FIG. 1 for sake of clarity. It should be understood, however, that other types of network configurations known in the art may be used as system 100.

The CPS server 102 may be any appropriate server without departing from the spirit and scope of the present invention. For example, the CPS server 102 may be a Microsoft content management server as developed and marketed by MICROSOFT Corporation of Redmond, Wash., USA. Inasmuch as the CPS server 102 is known or should be apparent to the relevant public, such CPS server 102 need not be described in detail herein except as set forth.

CPS Server

In the preferred embodiment, the CPS Server is operable on Windows NT Server, release 4.0 or higher, in both single and multiprocessor configurations. Those skilled in the art, however, recognize that the CPS Server 102 can be ported to other computing platforms. Multiple systems may be clustered together to support higher system workloads and failsafe operation.

As seen in FIG. 1, the CPS server 102 includes a content database 103 within which is stored information on the capital project.

Also typically, the CPS server 102 works with a network interface 105 by which the CPS server 102 receives information from users at client devices 104 and returns reports in response thereto. As may be appreciated, the network interface 106 handles all basic network communications.

As seen in FIG. 1, a core component of the CPS Server 102 is the Capital Projects source code engine 107. The Capital Projects source code engine 107 performs all of the server side functionality in managing the workflow and dispensation of financial resources and implementation of project requirements for capital projects.

A preferred embodiment of the Capital Projects source code engine 107 is written using JAVA, C, and the C++ language and utilizes object oriented programming methodology. Object Oriented Programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

Network

Network(s) 106 can involve permanent connections, such as cables, or temporary connections made through telephone or other communication links. Network(s) 106 can be as small as a LAN (local area network) consisting of a few computers, printers, and other devices, or it can consist of many small and large computers distributed over a vast geographic area (WAN or wide area network), or it can consist of both types of networks (both LAN and WAN).

Client Device

The client device 104 may be any appropriate computing device without departing from the spirit and scope of the present invention, presuming that such client device 104 and the browser thereon provides the functionality required by the user to establish the connection clear security policies and enter the data. Notably, although the CMS 12 likely serves the page 16 in a format such as Hyper Text Markup Language (HTML) or eXtensible Markup Language (XML) or variations thereon, the CMS 12 need not necessarily produce the page 16 in such format.

Network Interface

The network interface 105 may be any appropriate interface without departing from the spirit and scope of the present invention. For example, the network interface 105 may be based on MICROSOFT ASP.NET HTTP runtime software as developed and marketed by MICROSOFT Corporation of Redmond, Wash., USA. Inasmuch as the network interface 105 is known or should be apparent to the relevant public, such network interface 105 need not be described in detail herein except as set forth.

As previously described, FIG. 1 provides an example system overview according to a preferred embodiment. Various changes and/or modifications may be made to the system and still fall within the scope of the present invention. For example, it should be understood that the present invention is not limited to any particular network architecture or configuration such as described in FIG. 1. The present invention may be applied with utility on any electronic device in any network that can be used for data entry and transfer.

Capital Projects Management Method

The method of the invention for processing records is described hereafter in a non-limiting embodiment intended for use primarily by K-12 public school systems in the state of New York. The method shown in FIG. 2 and the other figures described herein may be performed, for example, by the CPS server 102 and/or the client device 104.

Figure 2:
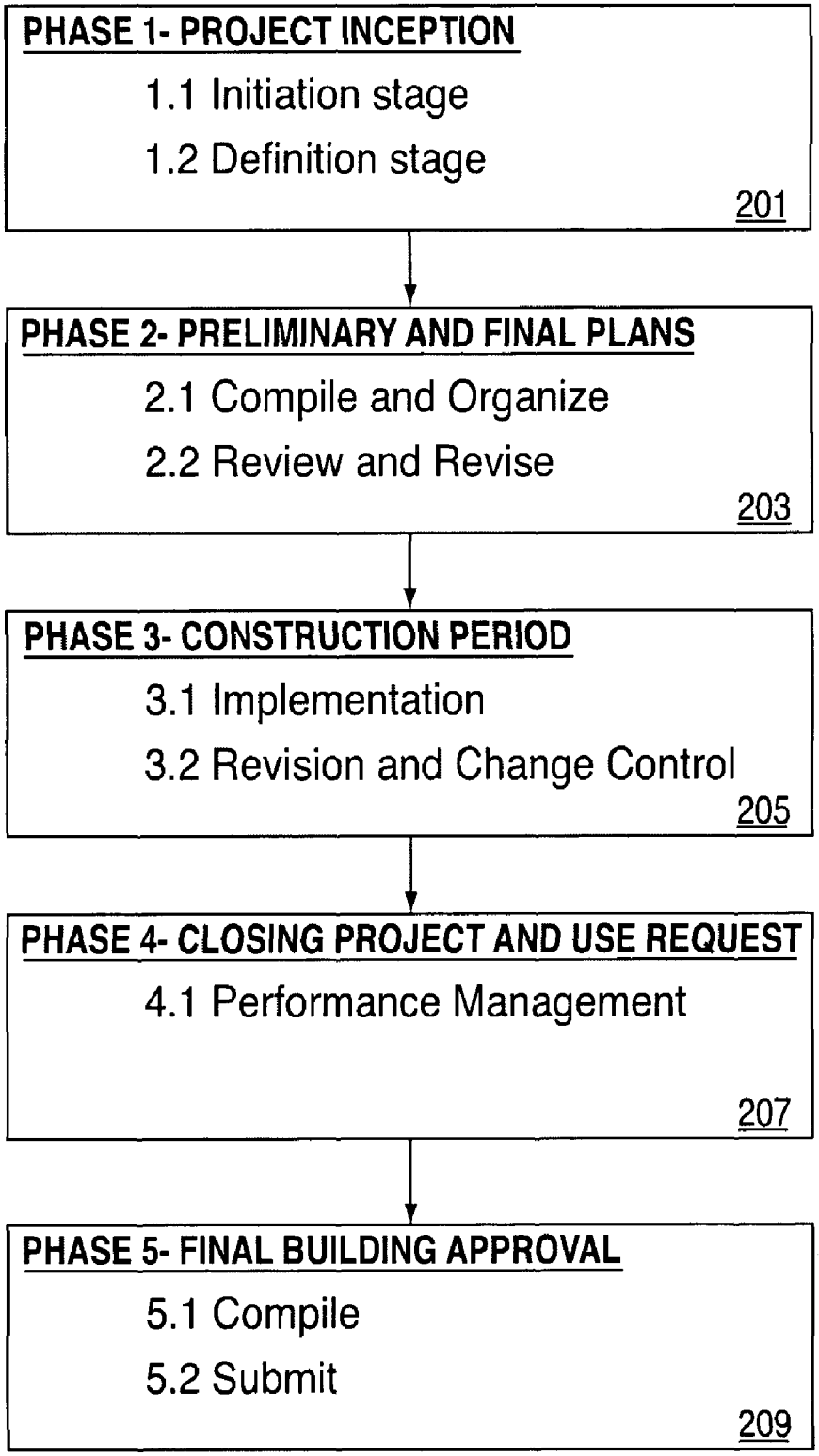
FIG. 2 is a general flowchart delineating the operations carried out by the computerized system of the invention for assisting municipal public clients in organizing, planning, implementing and tracking capital projects.

FIG. 2 shows a top-level flowchart view of a computerized system 100 and associated method to assist municipal public clients in organizing, planning, implementing and tracking capital projects in accordance with an embodiment of the present invention.

Figure 6:
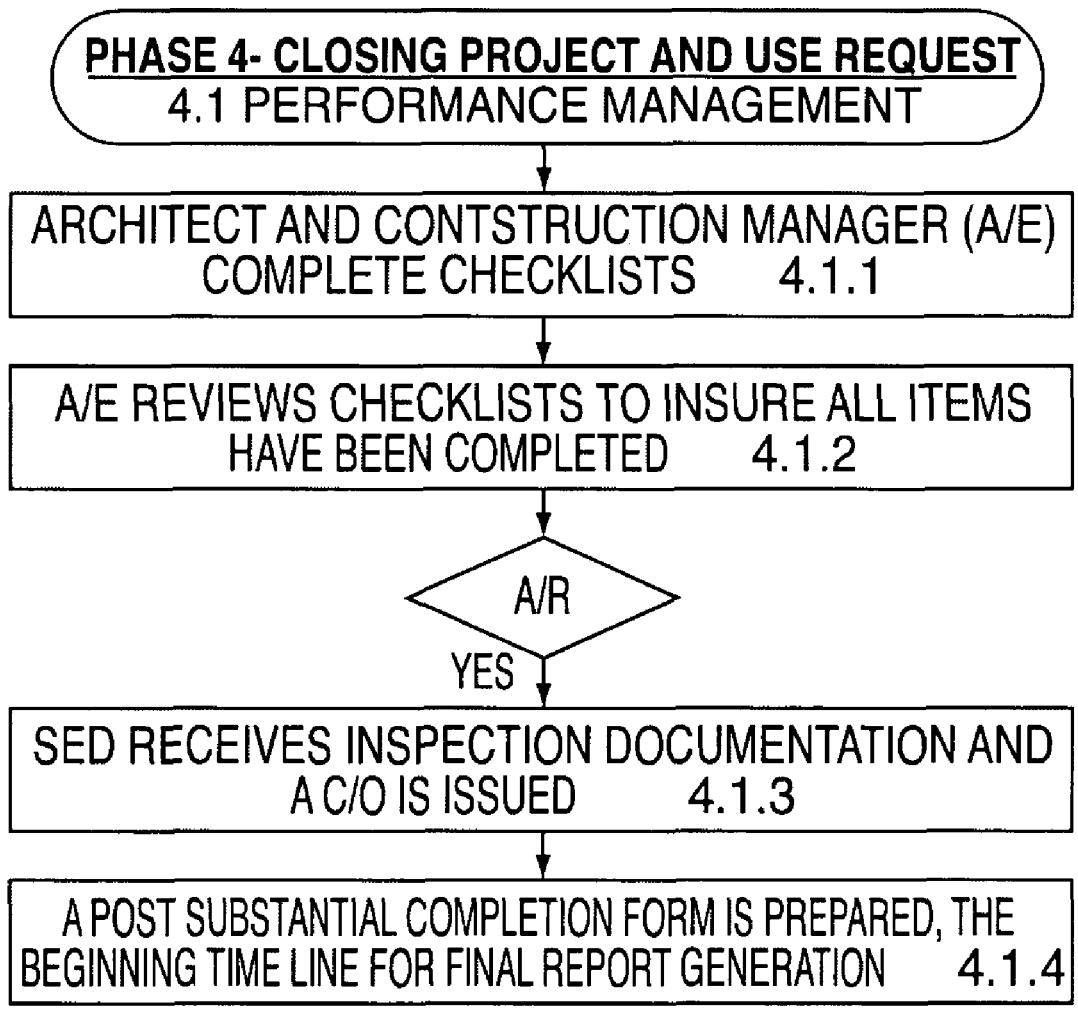
FIG. 6 is a more detailed flowchart of the fourth phase of the computerized system and method illustrated in FIG. 2, referred to as the "Closing Project and Use Request" phase.
Figure 7:
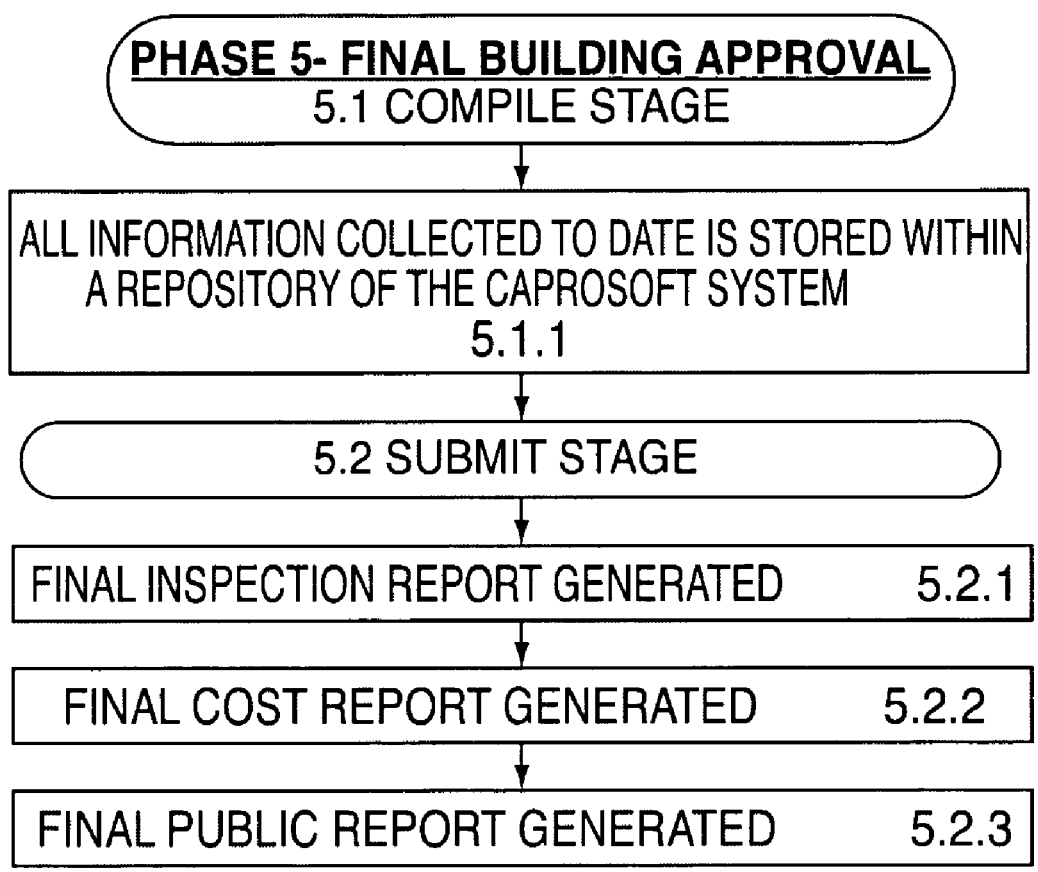
FIG. 7 is a more detailed flowchart of the fifth phase of the computerized system and method illustrated in FIG. 2, referred to as the "Final Report Generation" phase.

Referring now to FIG. 2, the computerized system and method of the present invention is generally comprised of five phases, generally organized as follows:

PHASE 1—Project Inception—(201)
    1.1 initiation stage steps: 1.1.1 through 1.1.9 (see FIG. 3)
    1.2 definition stage steps: 1.2.1 through 1.2.21 (see FIG. 3)
    PHASE 2—Preliminary and Final Plans—(203)
    2.1 Compile and Organize step 2.1.1 (see FIG. 4)
    2.2 Review and Revise steps 2.2.2 through 2.2.6 (see FIG. 4)
    PHASE 3—Construction Period—(205)
    3.1 Implementation steps 3.1.1 through 3.1.4 (see FIG. 5)
    3.2 Revision and change control steps 3.2.1 through 3.2.5 (see FIG. 5)
    PHASE 4—Closing Project and Use Request—(207)
    4.1 Performance Management steps 1.2.1 through 1.2.21 (see FIG. 6)
    PHASE 5—Final Report Generation—(209)
    Compile (703) steps 5.1 through 5.2 (see FIG. 7)
    Submit (705) steps 5.2.1 through 5.2.3 (see FIG. 7)

Prior to describing the detailed steps that comprise an assessment, valuation and tracking method to assist municipal public clients in organizing, planning, implementing and tracking capital projects, a broad overview is first provided to assist the reader.

PHASE I—Project Inception—(201)

Following is a broad summary of steps (1.1.1-1.1.2) of the project inception phase. The Central Office reviews all available Five Year Planning documentation. The primary areas of consideration in the review are the School District's projected educational and physical plant requirements (based on an evaluation of existing capital assets, such as school buildings, computer systems, fixtures, security), socio/economic demographics and the active Five Year Plan.

The review culminates in a selection of a particular Capital Project to be planned for over the course of the fiscal year. Capital Projects include (but are not limited to) the construction of a new building, the construction of an addition to an existing building, the renovation of an existing building (such as the rewiring of a building, the addition of a cafeteria, the creation of an auditorium, adding a pool), the choice and installation of computer systems, the choice and installation of desks, chairs and lockers, the level of security systems and coverage, and the outfitting of spaces. The key Core Planning Team members comprise one or more of the following individuals: the Business Official, one or more members of the Board of Education, the Superintendent or a designee, another School District designee, or any other person from the community.

The Core Planning Team is not given official active status to initiate any Capital Project. Instead, they act as a focus group tasked with thoroughly preparing and reviewing the proposed Capital Project requirements and specifications from the Central Office. For each Capital Project selected, the individuals needed and the performance requirements for the members of a Project Team are outlined. Such individuals are drawn from a group of outside consultants, not employees of the School District, and may comprise attorneys, financial experts, school bond experts, insurance experts, architects and construction companies. After review, the core planning team reports back to the Central Office with the outline for the Capital Project and an indication of their recommendation to either accept or reject each proposed Capital Project.

During the planning process, the Core Planning Team can utilize the CapProSoft™ system to review the requirements from the governmental authority for the particular type of Capital Project. The embodiment disclosed herein relates to a school construction project in New York State. For instance, the requirements of the New York State Department of Education ("SED") are found on the CapProSoft™ system. The system provides a comprehensive listing of required forms in the order of submission along with exception based reports for the planning team to be sure that required submissions are made accurately. The CapProSoft™ system can be configured to include the requirements of any other state or governmental agency.

The CapProSoft™ system provides a comprehensive control of project related data in order to comply with mandated reporting requirements, as follows:
    Five-year plan review and assessment
    Core planning team organization
    SED District Project Status
    Project Requirements and Specification Package
    Planning Document archive The following is a broad summary of step (1.1.3) of the project inception phase. The legal, insurance, financial impact and project team requirements have been determined by the District Superintendent's office and forwarded to the Core Planning Team for further assessment. If the recommendations provided by the Core Planning Team in their assessment are in accord with the Project Team requirements, they are confirmed as accurate and then returned to the Central Office for authorization to proceed or are otherwise reassessed and adjusted by both offices. This process is repeated until all financial, legal, insurance and Project Team requirements are accurately defined. The set of requirements constitutes the base line risk data specific to capital coverage limits and standards. This data is manually entered into the CapProSoft™ system via an information entry system.

Once the Capital Project is defined and the Project Team members chosen, the Business Official may begin to use the CapProSoft™ system and input the requirements as they have defined them, including the preset policies.

The CapProSoft™ system provides detailed planning reports to enable the municipal client to clearly select the most important projects to be included in a capital project program based upon space, occupancy, building deficiencies and control points required by governing authorities. It includes the following features:
    Internet links to the State Education Departments (SED) web-site
    Ability to download all available forms from the SED
    Project Information Package
    Document archive
    Public notification for project stakeholders through use of a web-based portal accessible to the public A broad summary of step (1.1.4) of the project inception phase is described herein. The approval from the Central Office provides authorization to proceed with the second phase (i.e., PHASE 2—Preliminary and Final Plans—(203)). The objective of the second phase is to define the intended scope and scale of the Capital Project(s) proposed in the initial assessment at PHASE 1.

Then, in step (1.1.5) of the project inception phase, Request for Performance (RFP) documents regarding the aforementioned legal, insurance and Project Team needs are written and then forwarded to the board of education (BOE), legal counsel and the financial advisor. Legal language is incorporated into the RFP by legal counsel and re-submitted back to the BOE for approval.

Next, in steps (1.1.7-1.1.7.4.3) of the project inception phase, after the Central Office has reviewed the RFP, the district Business Official is authorized to move forward and officially start the Capital Project. This activity began with the collection of key district planning documents such as the 5 Year-Plan (see Planning Description), consulting requirements, available vendors, project definitions, existing RFP's and other supporting documents, if available. These documents are compiled into an information package (IPKG) and presented to all stakeholder organizations (BOE, Central Office, Construction Manager (CM), Architects). Substantially coincident with this process, the CM and Architect(s) are passed a working RFP which identifies and further defines the actual terms of their future functions and responsibilities for the entire project. If the CM and Architect accept the terms as provided in the working RFP and IPKG, it is forwarded to the Central Office and BOE. If the terms are not acceptable, they may return the RFP and IPKG requests for further clarification and refinement. In either event, the CM's and Architect's responses to these terms are submitted to the Central Office for review. As needed, legal or financial advisors may be consulted in conjunction with their final evaluation. When the Central Office has issued approval, the voting public is informed by whatever means available of the district's intention to start a new Capital Project.

Included in the CapProSoft™ system are the following:
Internet links to the State Education Departments (SED) web-site
Ability to download all available forms from the SED
Project in-basket process flow control,
Project RFP Package
Ability to assess Insurance Compliance
Legal and RFP Document archive
Public notification for project stakeholders through use of a web-based portal accessible to the public What follows is a broad summary of steps (1.1.8-1.1.9.3.2) of the project inception phase. After BOE review and approval of the responses to the RFPs as received from the consultants (Architect, CM, and any other vendors), the Project Team is officially formed and authorized to create Letters of Intent (LOI) for the project. There are four types of state approved LOI forms from which the Project Team must determine the proper category for the construction type of Capital Project. LOIs are categorized as follows: (1) New Construction; (2) Manufactured (i.e., pre-fabricated units); (3) Leased or Discovered (i.e., newly discovered structures) Buildings, and (4) District Wide Projects (i.e., such as rewiring telephone lines in every building or installation of wired (LAN) computer networks). The Project Team may choose to utilize a task based worksheet available on the CapProSoft™ system in preparing the LOI, prior to preparation of the final document. On completing the LOI document, the Project Business Official, as a quality control measure, examines the LOI documentation for accuracy and compliance in accord with the SED information requirement for a state aided Capital Project. At this time, the Business Official can use the CapProSoft™ system to complete all of the state forms necessary for the project. The CapProSoft™ system itself will check for accuracy and compliance with the SED requirements. When this requirement has been met, the LOI information is forwarded to all community stakeholders, i.e., the Superintendent, Core Planning Team, BOE and the local community within the district. The Project Team, as a final measure prior to submission of the documents to the SED, performs a final review of the LOI information package. Then the entire LOI package of documentation is submitted to the SED, after which the SED examines this information for consistency, and if approved, provides back to the district an official 'SED Project Package'. The Business Official now informs the Superintendent, Core Planning Team and BOE of the State's approval of the Capital Project.

Steps (1.2.1-1.2.10.2) describe the next part of the project inception phase. After the LOI(s) have been submitted and responded to by the SED, the Business Official and Central Office review the SED response. The General Project Information which has been previously entered into the CapProSoft™ system by the Business Official is updated with the state assigned Project Number. Information is also entered regarding a State assigned SED Project Manager (SPM) who will act as a liaison between the district and State for the duration of the Capital Project. As the project moves forward, the Business Official and AE update the CapProSoft™ system with all Project SCOPE definitions, selected cost budgets, and the district's preliminary approval information and also respond to any inquiries from the State related to the submitted LOI(s).

As a next step, the Business Official collects the Preliminary Budget and SCOPE information and forwards it as a 'working package' to the Core Planning Team. The Core Planning Team is comprised of the Fiscal Advisor, Bond Counsel, Architect, and Construction Manager. After the CPS Core Planning Team has reviewed the 'working package' and has established and entered into the CapProSoft™ system baseline data specific to local demographics and tax rates, the Team will meet with the Business Official in order to determine the tax implications within the District and subsequently refine the Budget and SCOPE data for the project.

Other ancillary and essential data is also determined and entered into the CapProSoft™ system, including incidental cost budget, amortization, identity of bond counsel and the debt limit. Concurrently with this activity, the Business Official uses the CapProSoft™ system to acquire the State's checklist of governing requirements, to which strict adherence is mandated. On completion of the Core Planning Team's evaluation and findings, the Team's recommendations are sent to the Superintendent's Office (SO) for review and subsequent approval. On approval, the SO notifies the Business Official to authorize the Project Team (PT) to begin building the 'official' SED Scope Document as required by the State. Also at this time the Business Official will inform the BOE, other key local public persons and organizations of the intended Capital Project's current status.

The Project Team (PT) now receives formal authorization from the Business Official to proceed. The PT is responsible for closely managing the review of the 'Official Approval Checklist' (which is also generated by the CapProSoft™ system) which, when completed, becomes the District's official SCOPE document package for submission to the SED. All checks and controls (which have been pre-programmed into the CapProSoft™ system) as identified by the Official Approval Checklist must be strictly adhered to since any exceptions which occur (i.e., incomplete data or neglect to perform) results in loss of financial reimbursement and delayed project approvals. In turn, these exceptions will effect the further forward progress of development of the Capital Project. During the Checklist process, the Business Official provides oversight and forwards his/her comments to the Core Planning Team and the SO on a regular basis to keep them abreast of current developments and progress. The Business Official will also communicate regularly with the Core Planning Team and the SO for direction and/or further clarification of project information required by the PT to assist in the correct compilation of the SCOPE documentation. During this process, the CapProSoft™ system will be used to generate an LOI Exception report, identifying areas which are not in compliance with the pre-sets. After the PT has covered all Checklist criteria and no "exceptions" issues remain, the District possesses a final version of the SCOPE document. The Business Official will forward the final version of the SCOPE documentation to the PT for review and verification that compliance with all Checklist requirements has occurred and that the SCOPE documentation is in order. On approval from the PT, the Capital Projects implementation schedule can be established. To conclude this phase of the Capital Project process, the Business Official will notify all district and community stakeholders and the public, the latter through the CapProSoft™ system's web portal.

During the foregoing process, the CapProSoft™ system is utilized to assess which tasks should be assigned to the various consultants, to list these tasks and the identities of the consultants, and to prepare the SCOPE documentation. The CapProSoft™ system uses the predetermined pre-set criteria in preparing the documentation since the system will not permit generation of a report if it conflicts with the pre-set criteria.

Additionally, during the foregoing process, the financial report that shows the cost of the Capital Project to the district is generated by the CapProSoft™ system.

Steps (1.2.12-1.2.20) are now summarized. Once the PT has confirmed the Project Scope and compliance with the Official Checklist, the Business Official proceeds to establish the project Construction Implementation Schedule and to inform all District organizations and community stakeholders. In preparation for the project's construction phase, the Superintendent's Office (SO) creates a list of all district capital projects and their budgets that will be planned to begin over the coming year. The SO then organizes planning workshops to be held with the BOE at public hearings along with conferences and site inspections with primary contractors of any intended capital project. After initial presentation to the BOE, and once the workshops, conferences and inspections are completed, the SO will formally present their determinations to the BOE. The BOE reviews the SO(s) findings and, if approved, a Bond Issue resolution is created, a Vote date is set and the public is duly informed.

After the public vote, the SO reviews the public response. If the public rejects the bond proposition, the SO will use the CapProSoft™ system to rework the Capital Project list and the budgets and resubmit the revised version to the BOE. The SO will also again conduct public hearings before the BOE and hold contractor conferences and site inspections, designed to result in revising the BOE(s) initial resolution. The Capital Project and proposed bond will again be the subject of a public vote. If the public response is favorable, the SO informs the BOE and will make a public statement of the District's intention to proceed with the Capital Project.

The Business Official then establishes the District Capital Fund and develops a Cash Flow Schedule for the project, which information is entered into the CapProSoft™ system. The PT analyzes this data and is provided an opportunity to use the CapProSoft™ system to update the project's budget financial allocations (Capital Fund amounts and Cash Flow information). Once the PT's analysis is completed, it forwards the adjusted information to the SO for authorization. Upon approval by the SO, the Central Office and the Business Official are notified again of the PT(s) reevaluation and updates to the financial data. These two teams will use the CapProSoft™ system to revise the financial allocations, including an analysis of tax implications, and will inform the BOE accordingly.

This financial planning and scheduling information is entered into the CapProSoft™ system and is used to prepare the SCOPE and Preliminary Final Approval documentation for submission to the SED. The State reviews the SCOPE and provides a response back to the District. Then, the Business Official examines the SED response. If favorable, the CapProSoft™ system is utilized by the Business Official to prepare a finalized budget which is then reviewed by the PT. Then it is placed before the public, which authorizes the District to move forward with the Capital Project construction. If the public does not approve the finalized budget, then the process outlined above is repeated.

Accordingly, the CapProSoft™ system provides for comprehensive and flexible reporting to the Capital Project audience including governing agencies, Central Office and stakeholders. During the foregoing process, the CapProSoft™ system is used to enter data and generate reports at each step.

These reports include "Contractor Conferences and Site Inspection", reports regarding which are valuation of existing facilities.

The system is also used to track Public Bond Issue activity.

The entry into the CapProSoft™ system of costs and assignment of costs to each assessment allows for a total project budget to be created and generates a Cash Flow Management Report on basis of pre-entered scheduled criteria.

Additional reports used during the foregoing process include SED Financial Impact Reassessment and Assess Insurance Compliance reports.

The entire review process is geared to produce the SEC Preliminary Submission of SCOPE and Financial Approval Package.

Public notification for project stakeholders is accomplished through the web portal.

PHASE 2—Preliminary and Final Plans—(203)

Steps (2.1.1.-2.2.7) are comprised of the following actions.

Upon reviewing the SED response to the Scope and Preliminary Final Approval (PFA) approval of the finalized budget by the BOE, the Business Official directs the PT to begin developing the Final Approval package. The PT then compiles the standard set of forms required by the SED. These documents cover the following subjects: (1) Code Compliance; (2) Building Evaluation; (3) Preliminary Final Approval; and (4) Final Approval. Submission of these documents to the SED does not occur until they have been completed and verified for accuracy and content. The CapProSoft™ system itself conducts verification by utilizing the pre-programmed presets. During this process, the PT will visit the proposed project site and perform inspections, develop an inventory of the site technology and record their evaluations into the appropriate SED forms, using the CapProSoft™ system. At any time during this process, the Business Official can obtain Exception Reports from the CapProSoft™ system that reflect any issues related to the PT's compilation of the Final Approval (FA) documentation.

After all FA information has been collected and compiled by the PT, the Business Official will obtain and review all of the Final Approval documents. The BO will use the CapProSoft™ system to format this information into a Final Approval Preparation package and pass it back to the PT for their final review. Following the PT's review and subsequent approval, the Business Official sets a tentative SED FA package submission date, enters it into the system, and performs a review of the Capital Project's legal documentation. Prior to the District's target submission date, the Business Official will meet with the state assigned SED representative and discuss the availability of State funds (i.e., Building aid) to the district for the project. Also at this time, procurement policies for the project are established and entered into the CapProSoft™ system.

Once these tasks are accomplished, the SED FA package submission target date is finalized. As a result of a successful meeting with the State SED representative, the official Final Approval package is forwarded to the PT for a pre-submission review. If all FA package documentation is in order, the PT notifies all local organizations and community stakeholders. The web portal is one notification means. When the SED submission date arrives, the completed FA package is generated by the CapProSoft™ system and submitted to the SED. After receipt, the SED reviews the District's information, and, if approved, the Capital Project's Building Permit is issued. On receipt of the Building Permit, it is entered into the system, and the Business Official informs all local organizations and community stakeholders. The CapProSoft™ system web portal is used. The District enters the construction phase of the Capital Project.

During the aforementioned process, the CapProSoft™ system provides for budget confirmation and project "start to finish" tracking by budget and actual expense. Building aid formulas are calculated by the CapProSoft™ system to assess project aidability ratios based on building assessments, costs, demographics and allowable space requirements. The forms provided include the following:

Final Approval document compilation
Final Approval Package
Project Team FA review
SED Building Aid
Final Approval Submission Public notification for project stakeholders through the web portal is provided.

PHASE 3—Construction Period—(205)

Steps (3.1.1-3.2.5.1) are described herein. Once all local organizations and community stakeholders have been informed that the SED has issued the Building Permit, the District enters the construction phase of the Capital Project. The PT reviews the Implementation Plan that was created by the Business Official and initiates the bid process. The Business Official works in conjunction with the PT and is responsible for managing the formulation and distribution of the formal bid request documentation to vendors, which documentation is generated by the CapProSoft™ system. The Business Official also acts as a liaison between the Architect (s) and Engineers and coordinates all vendor inquiries and requests for all project related bidding information. Prospective Contractors and Vendors will review the District's Request for Bid documentation and will submit their proposed financial estimates to the Business Official. All proposals are entered into the CapProSoft™ system and are reviewed and either accepted, rejected or returned to the vendor for further clarification or modification. If a vendor's bid is accepted, the Business Official will prepare the contract and forward it to the District's Legal counsel.

The Legal department will review the contract for accuracy and legal acceptability on behalf of the District. Legal also establishes specific guidelines for the vendor, which are entered into the CapProSoft™ system pertaining to: (1) setting expiration dates related to work completion; (2) performance standards; (3) early termination; (4) service agreements; and (5) payment distribution for contracted services. This legal documentation is then reviewed by the PT so that they may make changes or recommendations. In the event adjustments must be applied to a vendor's contract, this process is managed by the Business Official who will continually oversee this process until all Project legal definitions are acceptable to the District. On acceptance by the PT of the legal contract, the approved contracts are sent to the BOE. The BOE in turn provides the contract to the PT for its review. The PT forwards their recommendations to the BO for further clarification or modification. This process is repeated until all legal definitions are acceptable to the district.

If revisions are made to the legal documentation that subsequently alters the budget amounts allocated and or proposed for the vendor, the changed amounts are entered into the CapProSoft™ system and the vendor is contacted. The vendor will review this information as provided by the PT and respond to the PT. The CapProSoft™ system is integral to the Accept/Reject process since it compares the vendor's comments with the pre-sets. The vendor's response is either accepted or rejected by the PT. During this revision process, the Business Official will forward documentation to the SED, specifying the revised amounts.

For the duration of the Construction phase for a construction type of capital project, there is potential for change in a vendor's billable amounts for work performed. These change requests (i.e., Change Orders) will be submitted by the vendor to the PT for evaluation and entered into the CapProSoft™ system. The PT will either approve or reject the vendor's request for the additional payable amounts. The PT may determine it necessary to communicate with the vendor to obtain further clarification or information explaining the vendor's need for requesting these additional billing amounts. Approvals of vendor change requests by the PT are forwarded by the system to the Business Official for submission to the SED for evaluation. The Business Official reviews the SED response and either sends it back to the PT as a SED rejection of the vendor's request or accepted as a valid change to the vendor's billable work status. During this time, the Business Official can request reports to keep abreast of a vendor's billing status at any stage of the Construction Implementation process.

The CapProSoft™ system provides for project histories of Capital Project related expenses in one central repository, namely a central working environment to process project related data. To summarize, the foregoing legal requirements and vendor information is tracked by use of the CapProSoft™ system, through entry of data regarding the following:

Vendor Bid Coordination
Legal Guidelines
Change Order Request management
Change Order Status Reporting
Business Change Order Verification
SED Change Order Submission PHASE 4—Closing Project and Use Request—(207)

In steps 4.1.1-4.1.4, as the project enters the completion phase, all revision and change documents generated by the CapProSoft™ system are to be reviewed by the PT. Their review entails examination of vendor history as it relates to all revisions and changes for the vendor during the duration of the project. The PT(s) findings are forwarded to the Business Official who will assign and schedule inspections to be performed by the project Architect or Engineer of the finished project facility to confirm compliance with all building codes and to ensure that all contractors have fully performed their contractual obligations. It is the responsibility of the Business Official to contact the Architect/Engineer and obtain the documented results of their inspections. On acceptance by the Business Official of the Architect's/Engineer's findings, the Business Official will use the CapProSoft™ system to process the appropriate forms and build the Contractor's Completion package for submission to the SED. The SED may issue the Certificate of Occupancy (CO) package. On receipt of the CO package from the SED, the Business Official reviews it and prepares and posts the Subcontractor Completion document. In the event the SED does not issue a CO but responds with questions and issues specific to the Architect's/Engineer's inspection, another inspection will be assigned and scheduled by the BO to comply with the SED's direction.

After all inspections have been satisfactorily performed and the Certificate of Occupancy has been posted by the CapProSoft™ system, the Final Report Package can be compiled by the system. The Business Official submits the Final Report Package to the SED for an Acceptance/Rejection review of the Capital Project's financial history and change order performance for the District's Capital project. If the State has officially rendered its approval, then the State has officially closed the file for the District's Capital Project. Otherwise, if the State has rejected the District's Final Report, the Business Official will evaluate where in the inspection or Certificate Posting phases the identified issues need to be addressed and resolved. This process will continue until the SED responds with favorable acceptance of the BO submission of the Final Report Package.

Using the CapProSoft™ system, timely and complete final reports of all project financial related data can be generated. The following topics are included:
Site Inspection and Inventory
Architect and Engineer Activity
Code Compliance Assurance
Sub-Contractor Completion
Final Report Compilation
Final Report Submission
Capital Project Closeout PHASE 5—Final Report Generation—(209)

In the final phase, the following reports are generated: (1) Final Inspection Report; (2) Final Cost Report; and (3) Final Public Report. The latter is available to the public through the web portal.

The following comprises the detailed steps that comprise an assessment, valuation and tracking method to assist municipal public clients in organizing, planning, implementing and tracking capital projects. The steps are described with reference to FIG. 1-7.

Phase I: Project Inception

The Project Inception phase is generally comprised of two stages, an "initiation" stage 301 and a "definition" stage 303.

Figures 3, 3A:
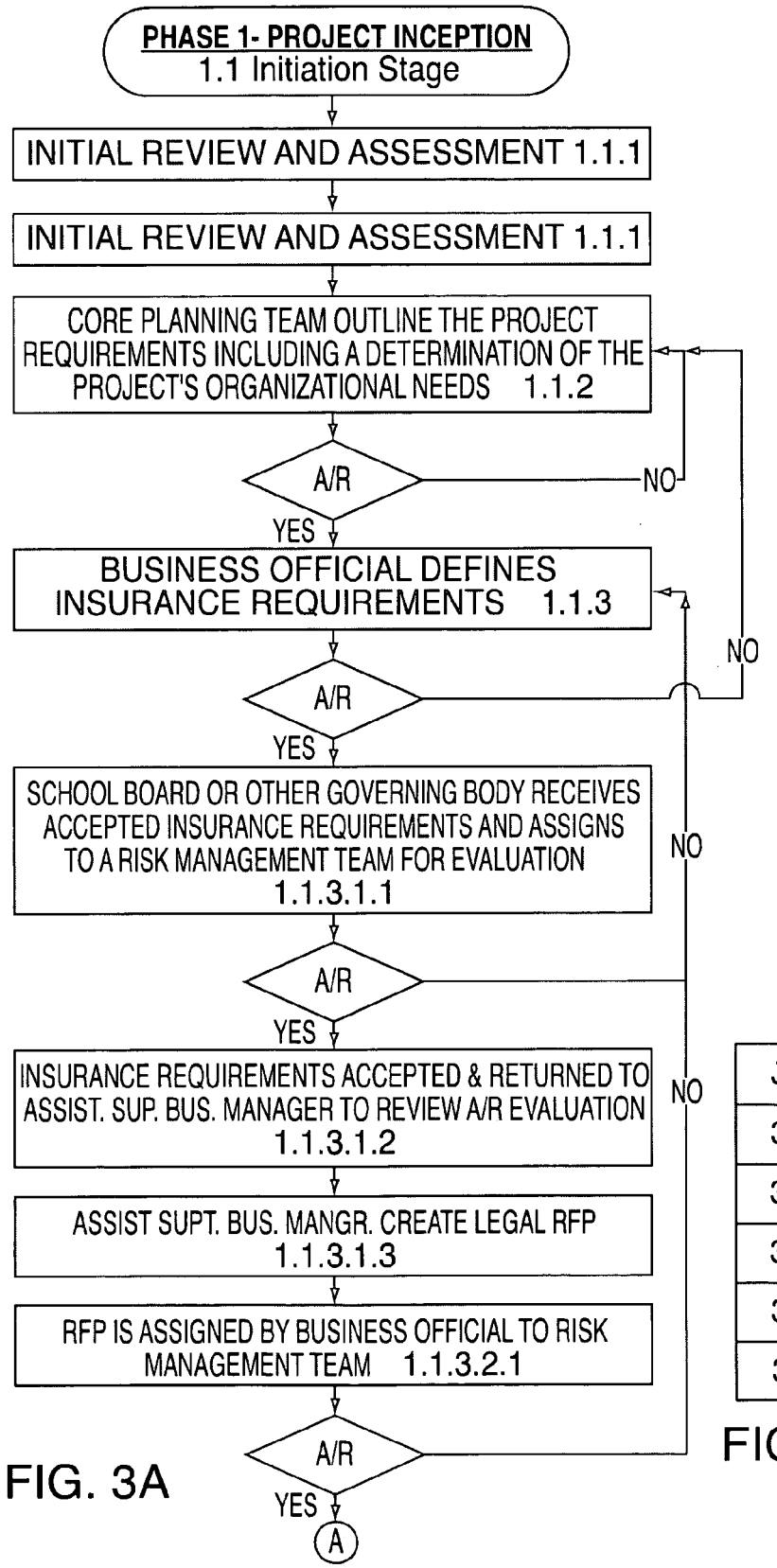
FIG. 3 is a more detailed flowchart of the first phase of the computerized system and method illustrated in FIG. 2, referred to as the "Project Inception" phase.
Figure 3B:
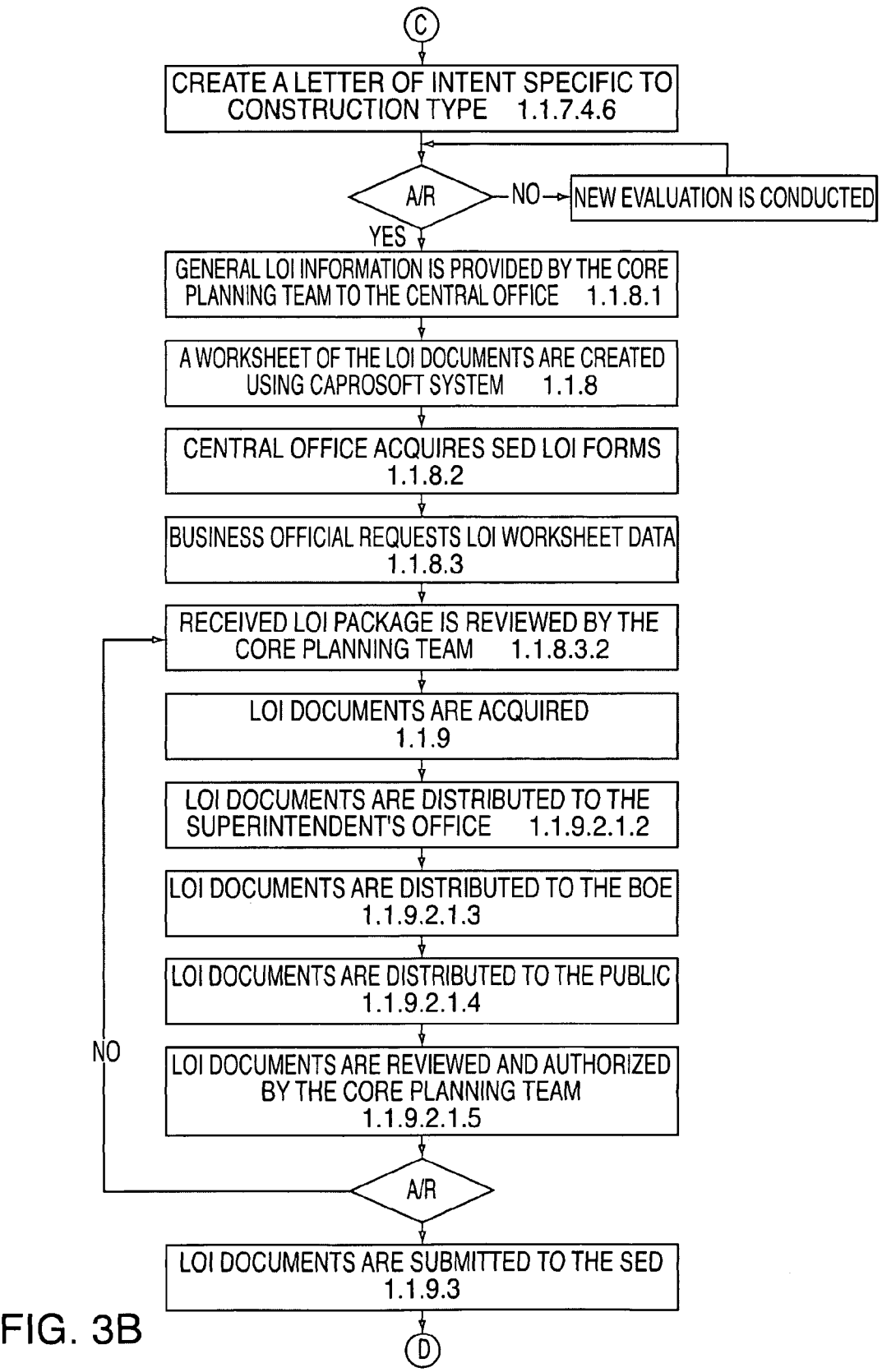
Figure 3C:
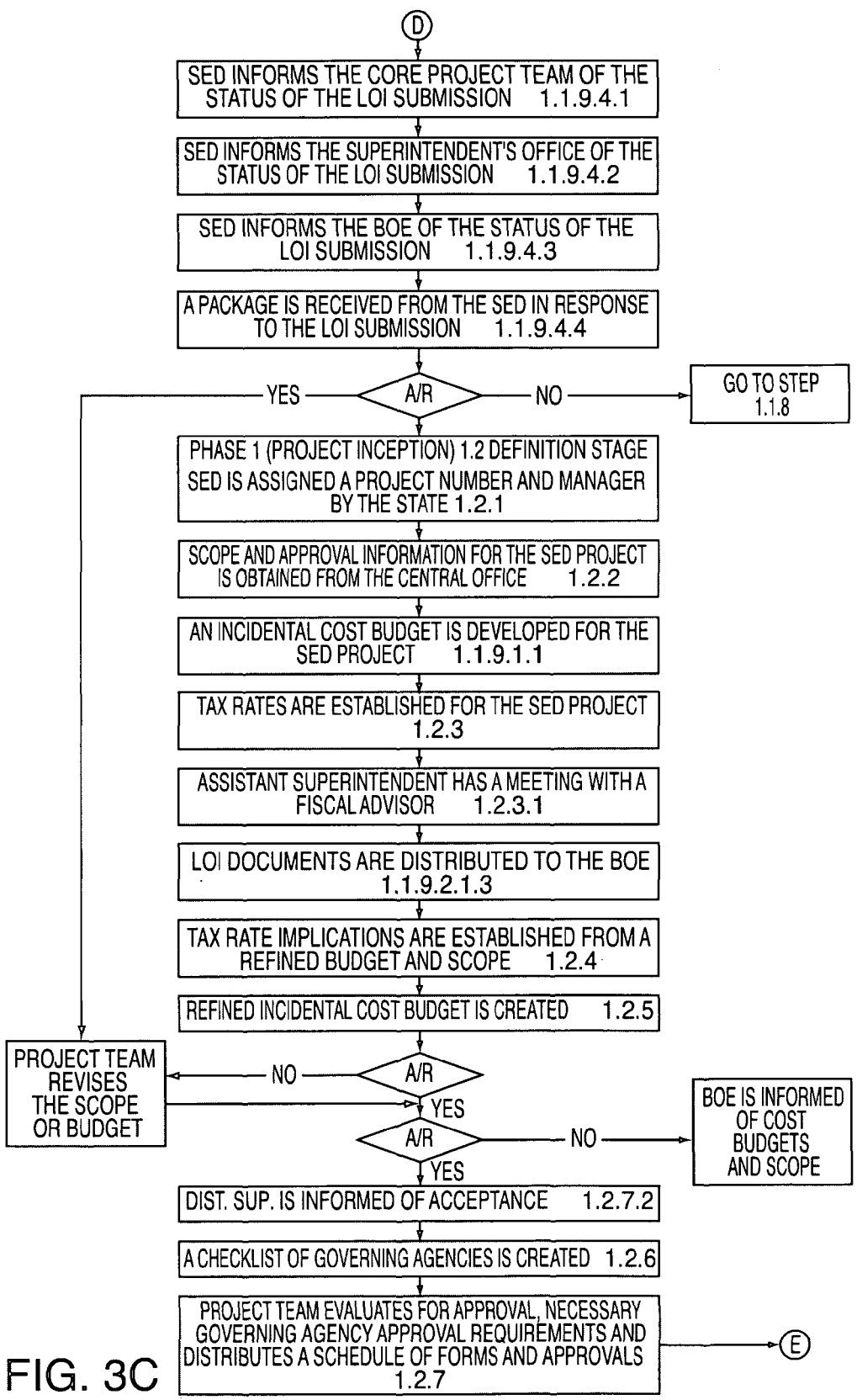
Figure 3D:
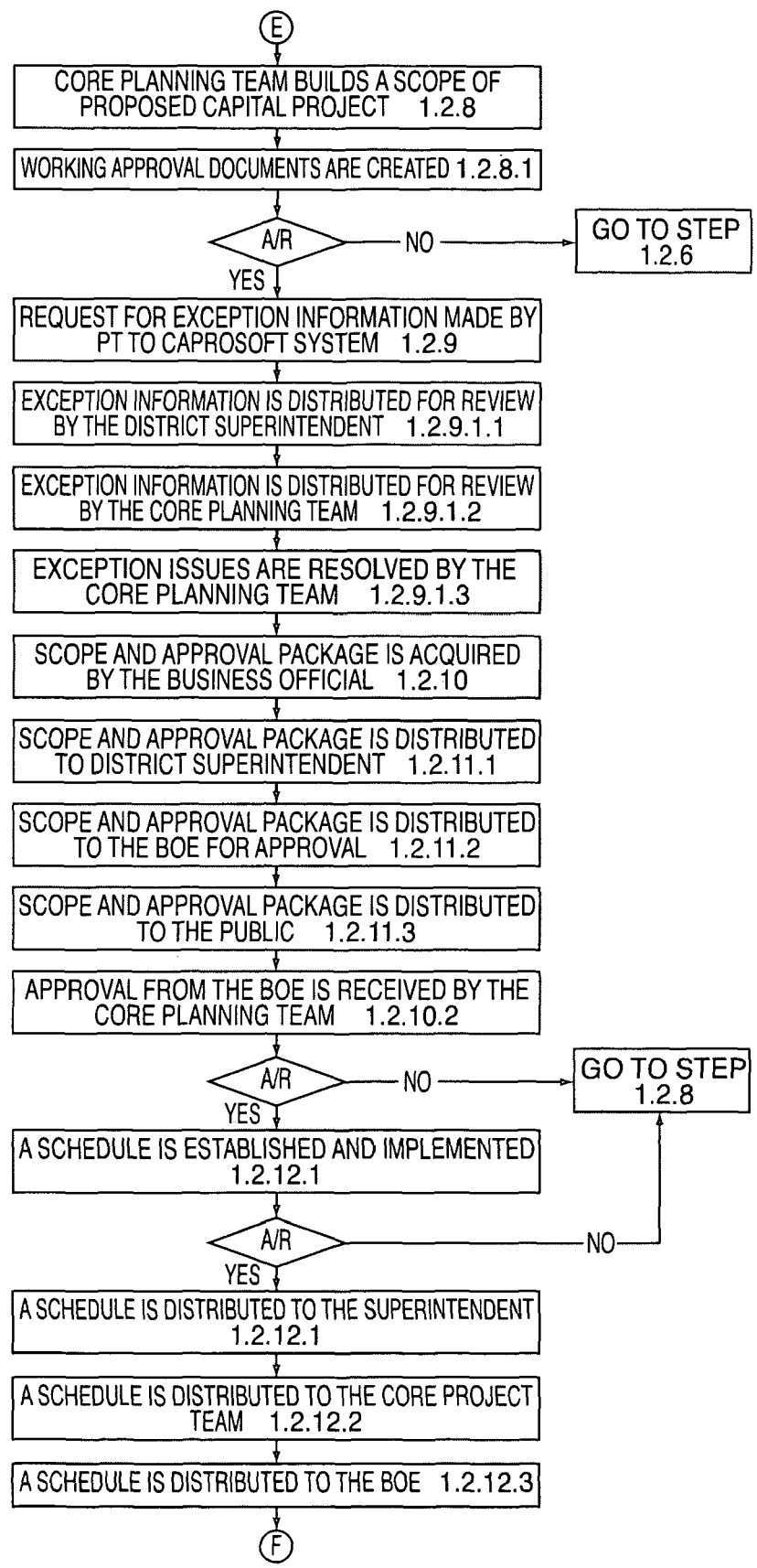
Figure 3E:
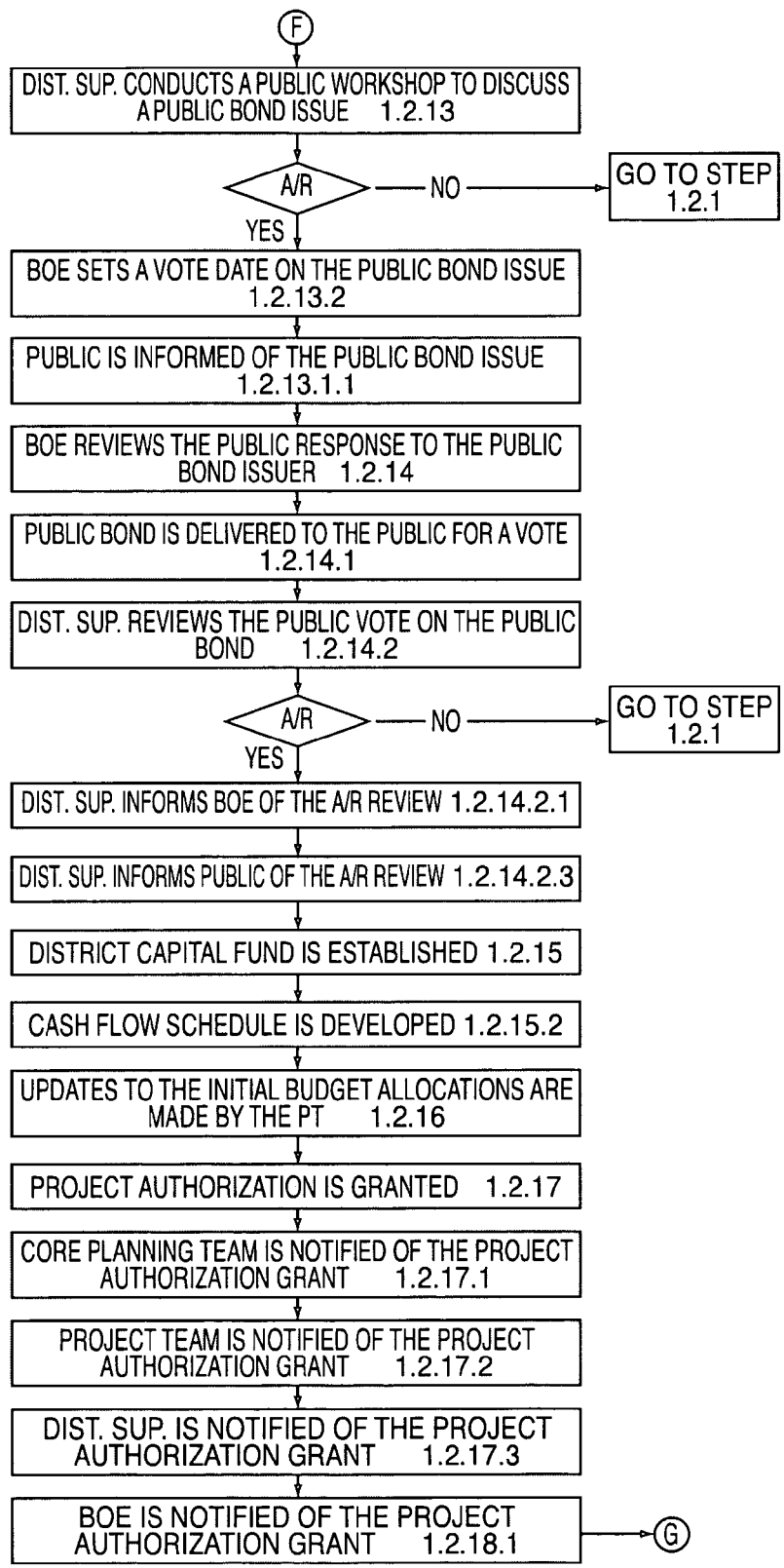
Figure 3F:
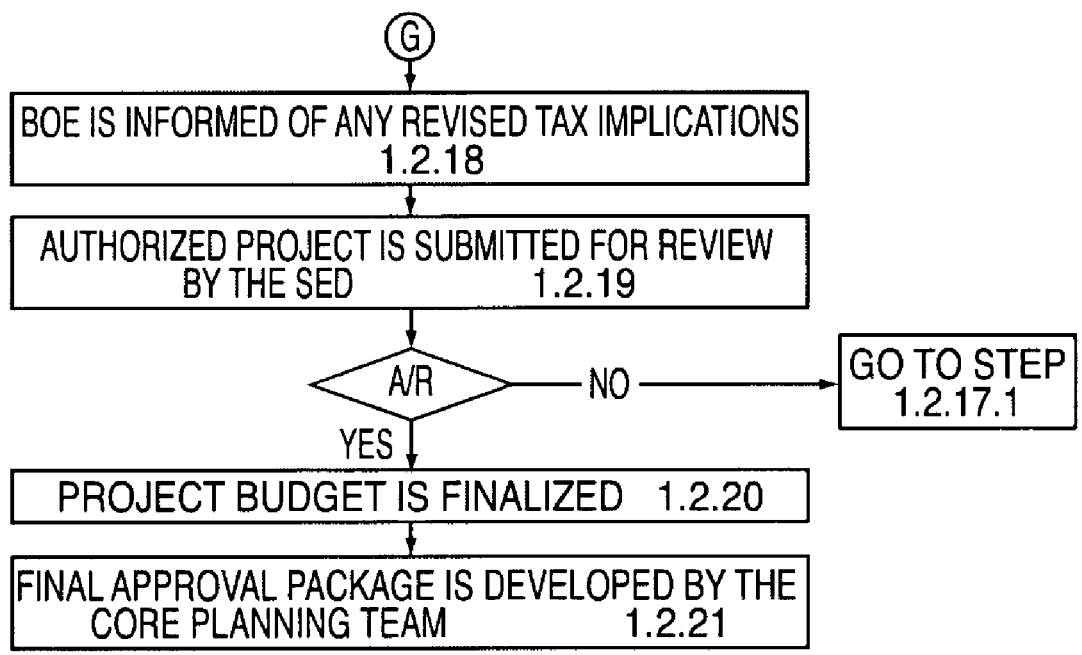

FIG. 3 is a more detailed flowchart view of the two stages.

Phase I: sub-phase 1.1—Initiation Stage 301

The "Initiation" stage 301 will be discussed with reference to the following steps:
Initial review and assessment 1.1.1
Outline project requirements 1.1.2
Define insurance requirements 1.1.3
SCOPE and scale assessment 1.1.4
Create RFP 1.1.5
Distribute RFP 1.1.6
Request project inception documents 1.1.7
Create Worksheet LOI documents 1.1.8
Acquire LOI documents 1.1.9

At step (1.1.1), during initiation, there is an initial review and assessment of one or more District projects made by the district superintendent's office. This involves a review by the office of all available five year planning documentation. The primary areas of consideration are the district's projected educational requirements, socio/economic demographics and the active five year plan. This is followed by the selection of which capital projects are to be planned for over the course of the fiscal year. Upon selecting a project, project planning is initiated at sub-step (1.1.1.1).

Next, at step (1.1.2), for a new project, a Core Planning Team outlines the project requirements including a determination of the project's organizational needs. The key Core Planning Team members comprise: the Fiscal Advisor, Bond Counsel, Architect and Construction Manager. Once the project organizational needs are determined, an A/R evaluation of the organizational needs of the proposed project is made by a governmental agency. In the present embodiment, that agency is the Department of Education of New York State ("SED"). In the case where the project requirements are rejected, the process returns to step (1.1.2). Otherwise, the process continues at step (1.1.3).

Next, at step (1.1.3), a member of the Core Planning Team, typically the Business Official affiliated with the school district's Central Office, defines the insurance requirements. An A/R evaluation is made by the Core Planning Team of the requirements presented by the insurance consultant. If the defined insurance requirements are not accepted, the process returns to (1.1.2), as described above. Otherwise, the School Board or other governing body receives the accepted insurance requirements and assigns the requirements to a risk management team for evaluation at step (1.1.3.1.1). An A/R evaluation is made by the risk management team of the defined insurance requirements. In the case where the risk management team rejects the requirements, the process returns to step (1.1.3) to redefine the insurance requirements. Otherwise, the insurance requirements are accepted and returned to the Business Official to review the A/R evaluation made by the risk management team at step (1.1.3.1.2).

At step (1.1.3.1.3), the Business Official creates a legal request for proposal ("RFP"). The RFP is assigned by the Business Official to the risk management team at step (1.1.3.2.1) for an A/R evaluation. The RFP is subject to an A/R evaluation by the risk management team for the purposes of insurance and proper requirements contractual language step (1.1.3.2.2). If the RFP is not accepted, the process returns to step (1.1.3). Otherwise, the process continues at step (1.1.4).

Next, at step (1.1.4), the Business Official initiates a "SCOPE and Scale Assessment" which involves the central office of the school district creating risk definitions at step (1.1.4.1). The Core Planning Team completes the "SCOPE and Scale Assessment" at step (1.1.4.2). The completed "SCOPE and Scale Assessment" is then reviewed by the district superintendent at step 1.1.4.3 and an A/R evaluation of the "Scope and Scale Assessment" is made by the district superintendent. If the A/R evaluation is unsuccessful, the process returns to step (1.1.4.2). Otherwise, the process continues at step (1.1.5).

Next, at step (1.1.5), another RFP for the tasks assigned to the Construction Manager and Architect is developed and implemented by the Business Official. RFP development includes the central office creating a project definition at step (1.1.4.4) and also determining project financials at step (1.1.5.3). The RFP is subjected to an A/Revaluation, made by the Business Official. If the A/R evaluation is unsuccessful, the process returns to step (1.1.5). Otherwise, the process continues at step (1.1.5.2), where a fiscal advisor is consulted. An A/R evaluation is made by the Superintendent's Office of the fiscal advisor's response. If the A/R evaluation is unsuccessful, the process returns to step (1.1.5). Otherwise the process continues at step (1.1.5.4), where legal language is incorporated into the RFP. An A/R evaluation is made by the Superintendent's Office of the RFP incorporating the legal language. If the A/R evaluation is unsuccessful, the process returns to step 1.1.5.

Next, at step (1.1.6), the newly created RFPs are then distributed to the Architect and Construction Manager. The Architect and Construction manager respond to the RFP at step (1.1.6.1). The responses are evaluated by the Core Planning Team at step (1.1.6.1.2). A determination is then made regarding whether or not to accept the RFP. If the RFP is rejected, the process returns to step (1.1.5). Otherwise, the Board of Education (BOE) is informed of the accepted RFP at step (1.1.6.2) and a review is made of the construction manager's (CMs) and architect's response to the RFP at step (1.1.6.2.1). The CM's and Architect's responses are reviewed at step (1.1.6.1.2). A determination is then made by the BOE regarding whether or not to accept the CM's and Architect's RFP based upon the review made at step (1.1.6.1.2). Otherwise, the process continues at step (1.1.7). If not accepted, the process begins again at step 1.1.6 with new respondents, namely new architects and/or construction managers.

Next, at step (1.1.7), project inception documents are requested by the district superintendent. A project review is conducted at step (1.1.7.2) by the district superintendent. An A/R evaluation is made by the superintendent of the project review. If the A/R evaluation is unsuccessful, the process returns to step 1.1.6. Otherwise, the BOE is informed of the project review at step (1.1.7.2.1) and the public is similarly informed at step (1.1.7.2.2).

Next, the Architect and Construction Manager are issued the RFP at step (1.1.7.3) for their evaluation and response at step (1.1.7.3.1). At step (1.1.7.3.2), the Architect's and Construction Manager's responses to the RFP are reviewed by the Core Planning Team. An A/R evaluation is made of the Architect's and Construction Manager's responses to the RFP. If the A/R evaluation is unsuccessful, the process returns to step (1.1.7.2).

Otherwise, the process continues at step (1.1.7.4.1), where the district superintendent evaluates the Architect's and Construction Manager's responses to the RFP. Then, at step (1.1.7.4.2) the BOE evaluates the Architect's and Construction Manager's responses to the RFP. An A/R evaluation is made of the BOE's evaluation of the Architect's and Construction Manager's responses to the RFP. If the A/R evaluation is unsuccessful, then the RFP is reissued at step (1.1.7.4.3) and the review process is repeated.

During the entire A/R process, the CapProSoft™ system automatically prompts Acceptances or Rejections since the data entered is continuously compared with the pre-sets.

Otherwise, the process continues at step (1.1.7.4.4) where the Business Official Business Official reviews the BOE's evaluation of the Architect's and Construction Manager's responses to the RFP. An A/R evaluation is made of the Business Official's review of the BOE's evaluation of the Architect's and Construction Manager's responses to the RFP. If the A/R evaluation is unsuccessful, then the RFP is reissued at step (1.1.7.4.5) and the review process is repeated.

Otherwise, a letter of intent (LOI) is created at step (1.1.7.4.6) that is specific to construction type. The LOI may include new construction, reconstruction, remodeling, use of modular pre-manufactured units, leased or newly discovered structures and district wide projects, such as installation of a new telephone or wired computer access (LAN) in every facility in the district. The professional consultants utilizing the CapProSoft™ System's entry screens place project data into the central warehouse and the appropriate LOI is generated. An A/R evaluation is made of the LOI. If the A/R evaluation is unsuccessful, a new evaluation is conducted and LOI process begins again. Otherwise LOI general information is provided by the Core Planning Team to the Central Office at step (1.1.8.1).

Next, at step (1.1.8), a worksheet of the LOI documents is created using the CapProSoft™ system. At step (1.1.8.2), the central office acquires State Education Department (SED) LOI forms. Next, at step (1.1.8.3), the Business Official requests LOI worksheet data. In response, a received LOI package is reviewed by the Core Planning Team at step (1.1.8.3.2.).

Next, at step (1.1.9), the LOI documents are acquired. The acquired LOI documents are distributed to various entities: to the superintendent's office at step (1.1.9.2.1.2); the Core Planning Team at step (1.1.9.2.1.1); the BOE at step (1.1.9.2.1.3); and the public at step (1.1.9.2.1.4). The LOI documents are reviewed and authorized by the Core Planning Team at step (1.1.9.2.1.5). An A/R evaluation is made by the Core Planning Team. If the A/R evaluation is unsuccessful, the process returns to step (1.1.8.3.2). Otherwise the process continues at step (1.1.9.3) where the LOI documents are submitted to the SED. The SED informs the BOE of the status of the LOI submission at step (1.1.9.4.3), the Core Project Team at step (1.1.9.4.1) and the Superintendent's Office at step (1.1.9.4.2). At step (1.1.9.4.4), a package is received from the SED in response to the LOI submission. An A/R evaluation is made by the core planning team of the received package. If the A/R evaluation is unsuccessful, the process begins again at step 1.1.8. Otherwise, the process continues at step (1.2.1). Again, all of the A/R functions are automatically performed by the CapProSoft™ system based on a comparison with the pre-programmed pre-sets.

1.2 Definition Stage

The "Definition" stage 305 will be discussed with reference to steps 1.2.1 through 1.2.21.

SED Project is assigned a project number 1.2.1
Obtain approval information for SED project 1.2.2
Establish tax rates for SED project 1.2.3
Establish tax rate implications from a refined budget and scope 1.2.4
Create a refined incidental cost budget 1.2.5
Create checklist of governing agencies 1.2.6
Evaluate for approval 1.2.7
Build scope document 1.2.8
Request exception information 1.2.9
Acquire SCOPE and approval package 1.2.10
Inform 1.2.11
Establish and Implement schedule 1.2.12
Superintendent Workshop preparation 1.2.13
Review BOE public Bond issue response 1.2.14
Establish district capital fund 1.2.15
Updates to the initial budget allocations are made 1.2.16
Project authorization is granted 1.2.17
The BOE is informed of any tax implications 1.2.18.
The authorized project is submitted for review by the SED for approval 1.2.19
Project budget is finalized 1.2.20
A final approval package is developed by the project team 1.2.21

At step (1.2.1), the SED project is assigned a project number and manager by the State.

Next, at step (1.2.2), SCOPE and Approval information for the SED project is obtained from the Central Office of the school district. An incidental cost budget is developed for the SED project at step (1.1.9.1.1).

Next, at step (1.2.3), tax rates are established for the SED project. This involves the Business Official attending a meeting with a fiscal advisor (1.2.3.1).

Next, at step (1.2.4), tax rate implications are established from a refined budget and scope.

Next, at step (1.2.5), a refined incidental cost budget is created. Issues that arise in connection with establishing a refined budget and scope include amortization tables, choice of bond counsel, and debit limits. An A/R evaluation is made by the Project Team of the refined incidental cost budget created at step (1.2.5). If the A/R evaluation is unsuccessful, the Project Team revises the scope or budget. Otherwise an A/R evaluation is made of original project SCOPE and budget. The BOE is informed of cost budgets and the SCOPE at step 1.2.7.1. Otherwise, the district superintendent is informed of acceptance at step (1.2.7.2).

Then, at step (1.2.6), a checklist of the governing agencies is created. The CapProSoft™ system creates a checklist of governing agency approval requirements.

Next, at step (1.2.7), the Project Team evaluates for approval the necessary governing agency approval requirements generated by the CapProSoft™ system and distributes a schedule of forms and approvals. The following exception reports generated by the system are utilized: (1) a checklist of the necessary applications for required building permits; (2) examination and approval of final plans and specifications (e.g., SCOPE, SEQRA (State Environmental Quality Review Act), SHPO (State Historic Preservation Office)); (3) budget refinements, (4) a checklist of the application for approval of final plans and specifications, (4) BOCES (Board of Cooperative Educational Services) issues regarding (a) existing building, (b) Department of Transportation; (c) asbestos structural responsibility, (d) code compliance, (e) complete plans and specifications, (f) 50 yr. SHPO and (g) certification of final building plans.

Next, at step (1.2.8), the Core Planning Team uses the CapProSoft™ system to build a SCOPE of Proposed Capital Project document. At step (1.2.8.1), working approval documents are created. The working approval documents consider a host of issues for approval, including the issues identified in (1) through (3) hereinabove. An A/R evaluation is made by the PT of the working approval document created at step (1.2.8.1). If the A/R evaluation is unsuccessful, then the process is repeated from step 1.2.6. If the A/R evaluation is successful, then the process continues at step (1.2.9).

Next, at step (1.2.9), a request for exception information is made by the PT from the CapProSoft™ System. The exception information is distributed for review by the Core Planning Team at step (1.2.9.1.2) and to the district superintendent at step (1.2.9.1.1). Any exception issues generated by the CapProSoft™ system are resolved by the Core Planning Team at step (1.2.9.1.3).

Next, at step (1.2.10), a SCOPE and approval package is acquired by the Business Official.

Next, at step (1.2.11), the SCOPE and approval package is distributed to the district superintendent at step (1.2.11.1), the BOE for approval at step (1.2.11.2), and to the public at step (1.2.11.3) (through the system's web portal). Approval from the BOE is received by the Core Planning Team at step (1.2.10.2). An A/R evaluation is made of the BOE's approval of the scope and approval package. If the A/R evaluation is unsuccessful, the process begins again from step 1.2.8. Otherwise, the process continues at step (1.2.12).

Next, at step (1.2.12), a schedule is established and implemented. An A/R evaluation is made of the schedule created at step (1.2.12). If the A/R evaluation is unsuccessful, the process repeats itself at step 1.2.8. Otherwise the schedule is distributed to the district superintendent at step (1.2.12.3), the Core Project Team at step (1.2.12.2) and to the BOE at step (1.2.12.3).

Next, at step (1.2.13), the district superintendent conducts a workshop to discuss a public bond issue. An A/R evaluation is made by the public of the public bond issue. If the A/R evaluation is unsuccessful the process reverts to one of the major preceding steps, namely step (1.2.1). Otherwise, the process continues at step (1.2.13.2) where the BOE sets a vote date on the public bond issue. The public is informed of the public bond issue at step (1.2.13.1.1). The web portal of the CapProSoft™ system is used.

Next, at step (1.2.14), the BOE reviews the public response to the public bond issue. The public bond issue is delivered to the public for a public vote at step (1.2.14.1). At step (1.2.14.1.1), the public votes on the public bond issue. At step (1.2.14.2), the district superintendent reviews the public's vote on the bond issue. An A/R evaluation is made of the public's response to the bond issue. If the A/R fails, the process repeats itself at step (1.2.1). The district superintendent informs the BOE of the A/R review at step (1.2.14.2.1) and the public at step (1.2.14.2.3).

Next, at step (1.2.15), a district capital fund is established. As part of establishing such a fund, a cash flow schedule is developed at step (1.2.15.2).

Next, at step (1.2.16), updates to initial budget allocations are made by the the PT.

Next, at step (1.2.17), project authorization is granted by the SED. The district superintendent is notified of the project authorization at step (1.2.17.3). The Core Planning Team is notified at step (1.2.17.1), the Project Team at step (1.2.17.2) and the BOE at step (1.2.18.1).

Next, at step (1.2.18), the BOE is informed of any revised tax implications.

Next, at step (1.2.19), the authorized project is submitted for review by the SED for approval. At step (1.2.19.3), the SED reviews the authorized project. An A/R evaluation is made by the SED. If the A/R evaluation is unsuccessful, the process returns to step (1.2.17.1). Otherwise, the process continues at step (1.2.20).

Next, at step (1.2.20), the project budget is finalized.

Next, at step (1.2.21), a final approval package is developed by the Core Planning Team. The final approval package preferably includes: (a) code compliance documentation, (b) building evaluation documentation, (c) preliminary final approval documentation and (d) final approval.

Phase II: Preliminary and Final Plans 203

Figures 4, 4A:
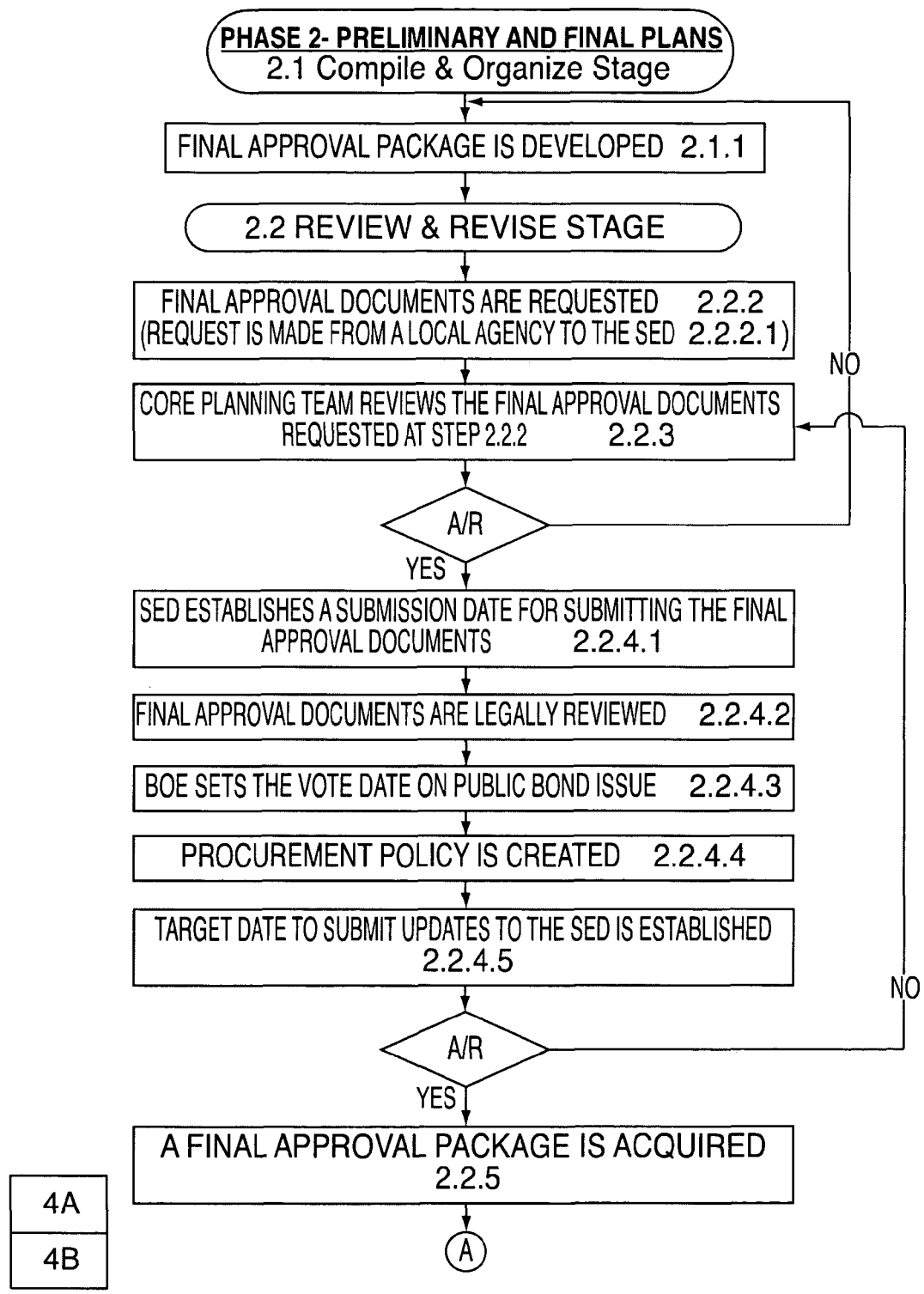
FIG. 4 is a more detailed flowchart of the second phase of the computerized system and method illustrated in FIG. 2, referred to as the "Preliminary and Final Plans" phase.
Figure 4B:
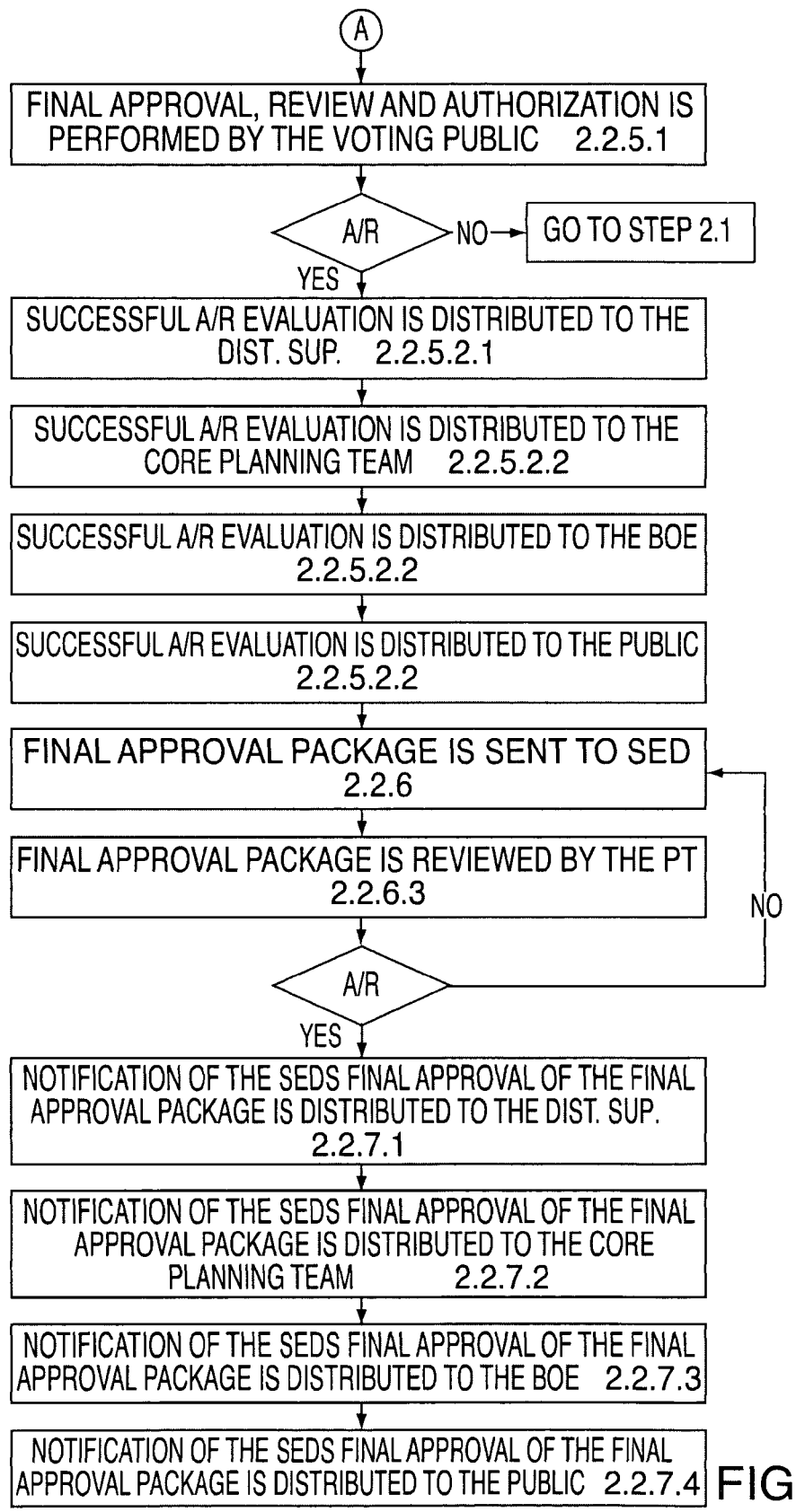

FIG. 4 is a more detailed flowchart view of the second phase of the computerized system and method of the invention, referred to herein as "Preliminary and Final Plans". Referring again to FIG. 2, the Preliminary and Final Plans phase is generally comprised of two sub-stages, a "Compile and Organize" stage 401 and a "Review and Revise" stage 403.

2.1 Compile and Organize Stage

The "Compile and Organize" stage will be discussed with reference to step 2.1.1. At step 2.1.1., the Business Official reviews the final approval package prepared by the Core Planning Team at Step 1.2.21. Any changes are entered into the CapProSoft™ system.

At step (2.2.1), a final approval package will be prepared. The package including final approval documentation such as code compliance, building evaluation, preliminary final approval and final approval, is prepared by the Core Planning Team.

2.2 Review and Revise Stage

The "Review and Revise" stage will be discussed with reference to steps 2.2.2 through 2.2.6.

At step (2.2.2), final approval documents are requested. Specifically, a final approval Information Request, is made by the local governing agency authorizing the project to the higher agency such as SED at step (2.2.2.1).

Next, at step (2.2.3), the Core Planning Team reviews the final approval documents requested at step (2.2.2). An A/R evaluation is made by the core planning team of the final approval documents. If the A/R evaluation is unsuccessful, the process repeats at step 2.1. Otherwise, the process continues at step (2.2.4.1) where the SED establishes a submission date for submitting the final approval documents. At step (2.2.4.2), the final approval documents are legally reviewed.

Next, at step (2.2.4.3), the BOE sets a vote date on the public bond issue. At step (2.2.4.4), a procurement policy is created. A target date to submit updates to the SED is established at step (2.2.4.5). An A/R evaluation is made of the project scope and budget. If the A/R evaluation is unsuccessful, the process returns to step (2.2.3). Otherwise, the process continues at step (2.2.5), where a final approval package is acquired. A final approval, review and authorization is performed by voting public at step (2.2.5.1). An A/R evaluation is made of the final approval, review and authorization. If the A/R evaluation is unsuccessful, Step 2.1 is repeated. Otherwise, the successful A/R evaluation is distributed to the district superintendent at step (2.2.5.2.1), the Core Planning Team at step (2.2.5.2.2), the BOE at step (2.2.5.2.3) and the public at step (2.2.5.2.4).

Next, at step (2.2.6), the final approval package is sent to the SED. Upon receiving a response to the final approval package from the SED, it is reviewed at step (2.2.6.3) by the PT. An A/R evaluation is made of the SED's response to the final approval package. If the A/R evaluation is unsuccessful, step 2.2.6 is repeated. Otherwise, notification of the SED's final approval of the final approval package is distributed to the district superintendent at step (2.2.7.1), the core planning team at step (2.2.7.2), the BOE at step (2.2.7.3) and the public at step (2.2.7.4). The SED's final approval includes a notification that a building permit has been issued and the construction may go forward.

Phase III: Construction Period

Figures 5, 5A:
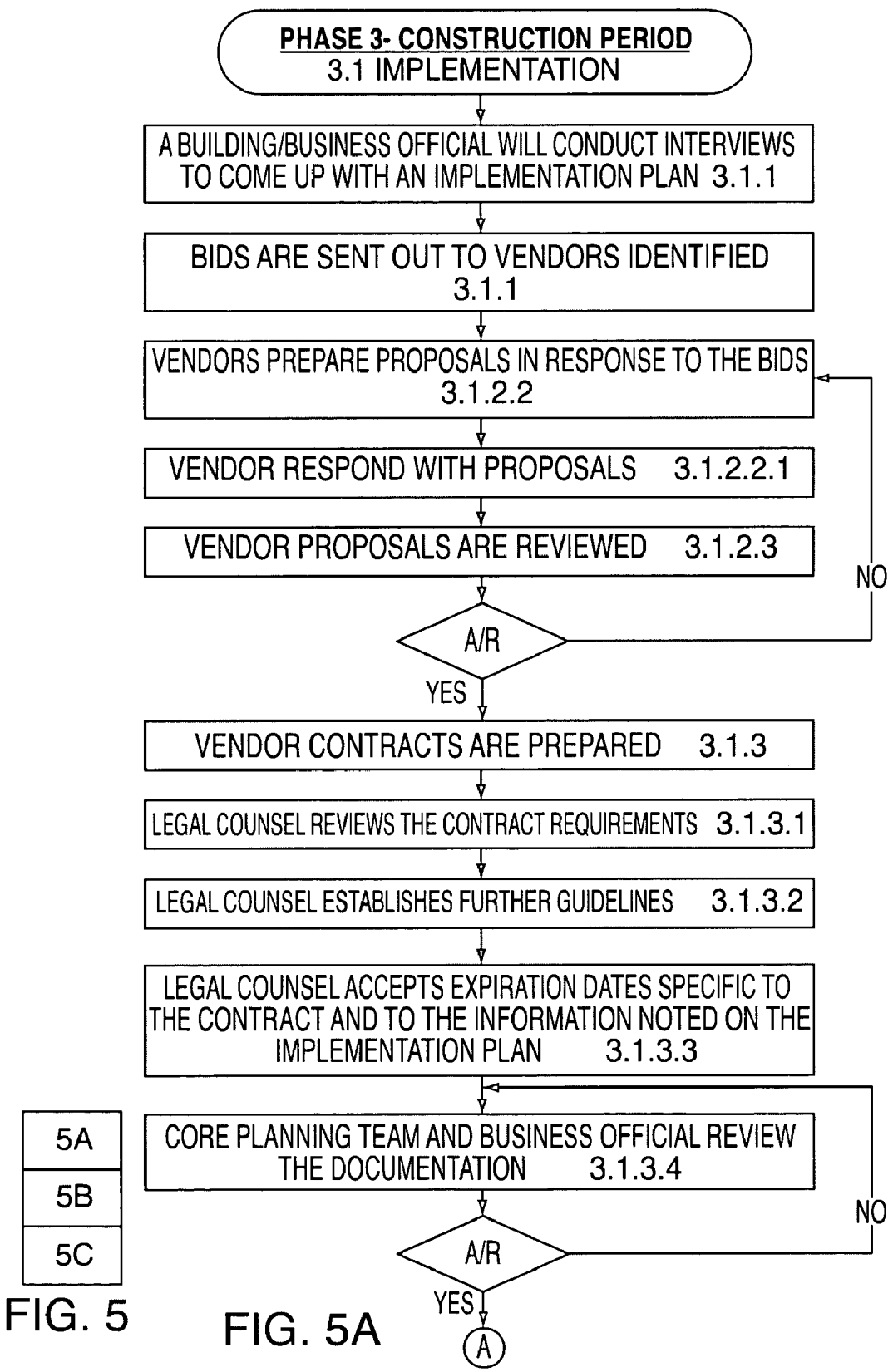
FIG. 5 is a more detailed flowchart of the third phase of the computerized system and method illustrated in FIG. 2, referred to as the "Construction Period" phase.
Figure 5B:
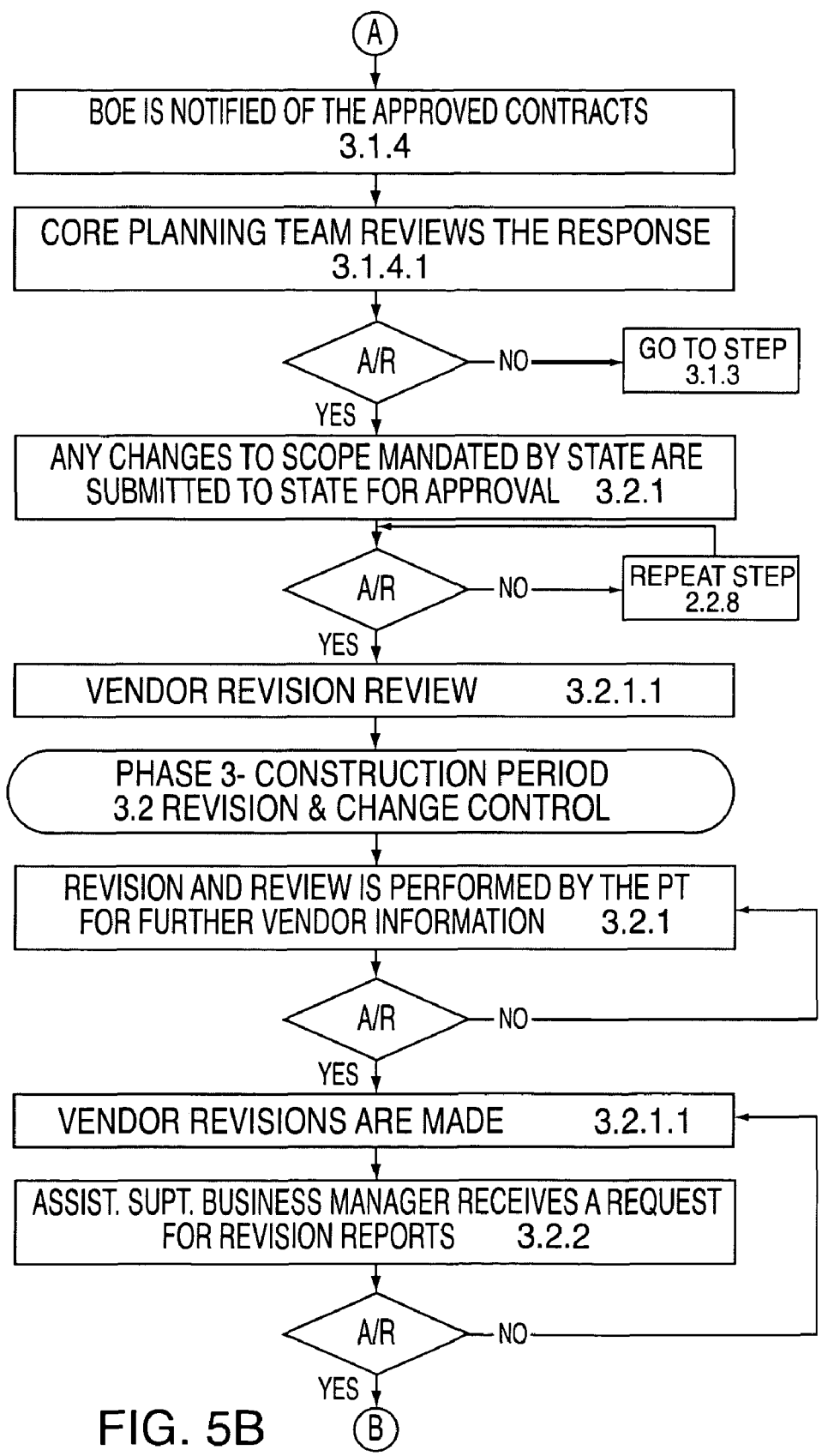
Figure 5C:
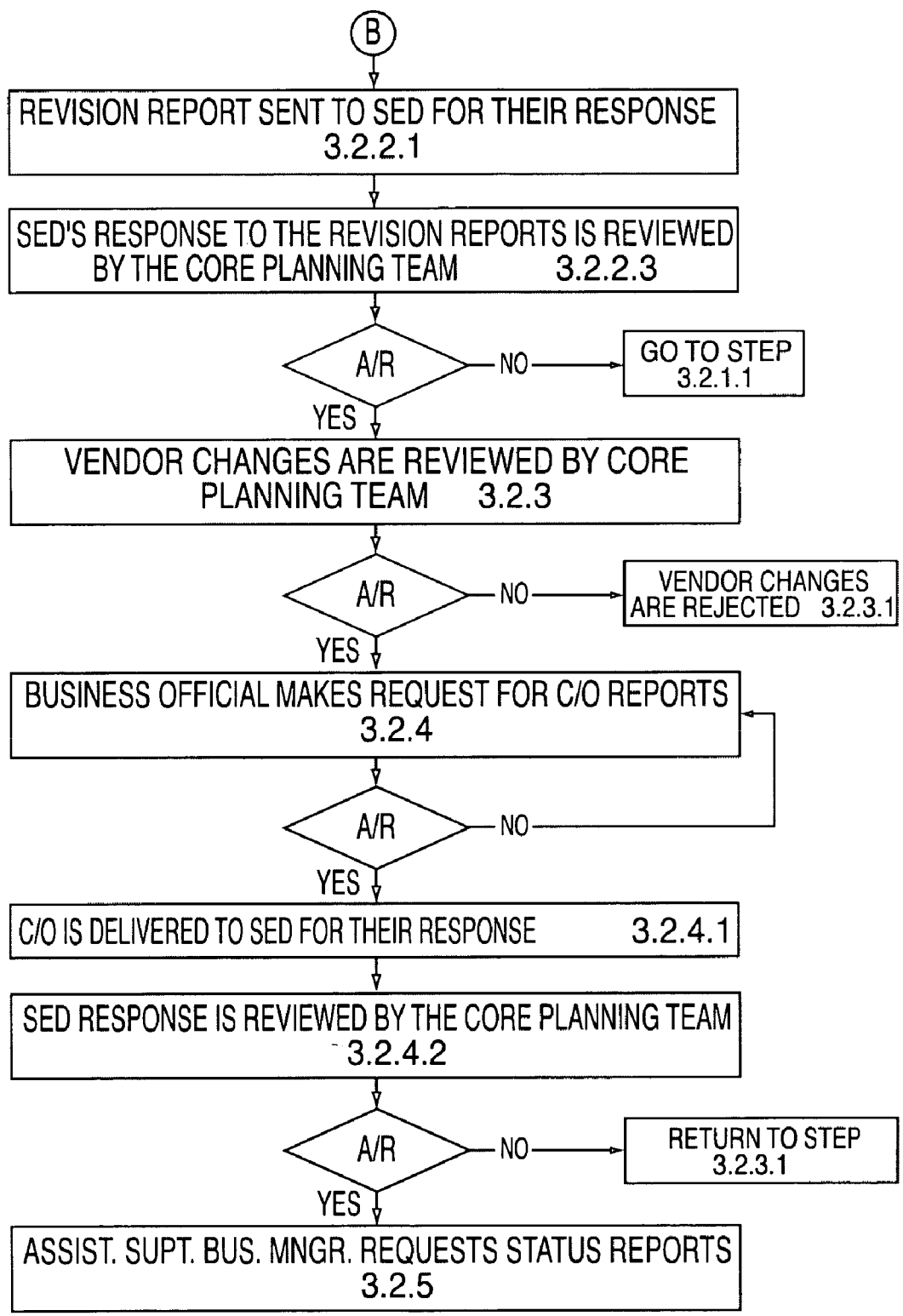

FIG. 5 is a more detailed flowchart view of the third phase of the computerized system and method of the invention, referred to herein as "Construction Period". Referring again to FIG. 2, the Construction Period phase is generally comprised of two stages, a first stage, referred to herein as an "Implementation" and a second stage, referred to herein as "Revision & Change Control".

3.1 Implementation The "Implementation" stage is discussed with reference to steps 3.1.1 through 3.1.4.

At step (3.1.1), the Business Official will conduct interviews to develop an implementation plan. The implementation plan involves the scheduling of events and vendor contracts for those vendors who have been selected and permitted to bid on the project. Information is inputted into the general vendor information database of the CapProSoft™ system that includes information regarding whether a particular vendor is in business, whether that vendor performed any services in the past for the district and if so, for what amount. The database essentially tracks vendor history.

Next, at step (3.1.2), bids are sent out to vendors identified at step (3.1.1). In response to the bids, the vendors prepare proposals at step (3.1.2.2) and respond with those proposals at step (3.1.2.2.1). The various vendor proposals are reviewed at step (3.1.2.3) by the Business Official. An A/R evaluation is made of the vendor proposals. If the A/R evaluation is unsuccessful, the process returns to step (3.1.2.2). Otherwise, the process continues at step (3.1.3).

Next, at step (3.1.3), vendor contracts are prepared. Legal counsel reviews the contract requirements at step (3.1.3.1). Legal counsel establishes further guidelines specific to the contracts at step (3.1.3.2) and accepts expiration dates specific to the contract and to the information noted on the implementation plan at step (3.1.3.3). At step (3.1.3.4), the Core Planning Team and the Business Official review the documentation. At step 3.1.3, an A/R evaluation is made by the planning team of the response. If the A/R evaluation is unsuccessful, the process returns to step (3.1.3.4).

Next, at step (3.1.4), the BOE is notified of the approved contracts at step (3.1.4). At step (3.1.4.1), upon receiving approval from the BOE at step (3.1.4), the Core Planning Team reviews the response. An A/R evaluation is made of the approved contract. If the A/R evaluation is unsuccessful, the process returns to step (3.1.3). Otherwise, if there were any changes to the SCOPE which were mandated by the State, those changes must be submitted to the State for approval. This qualifies as a revision review and is performed at step (3.2.1). An A/R evaluation is made of the revision review. If the A/R evaluation is unsuccessful, the process continues at step (3.2.1.1), where a vendor revision review is performed. Otherwise, step 2.2.6 is repeated. It is noted that a key feature of the invention is a full audit trail that tracks all data entered into the system, any changes made to the data, and the identity of users making the data entries/changes.

3.2 Revision & Change Control The "Revision and Change Control" stage 505 will be discussed with reference to steps 3.2.1 through 3.2.5

At step (3.2.1), a revision and review is performed by the PT for further vendor information. An A/R evaluation is made of the revision review. If the A/R is unsuccessful, the process continues at step (3.2.1.1), where vendor revisions are made. Otherwise, the process returns to step (3.2.1.).

Next, at step (3.2.2), the Business Official receives a request for revision reports. An A/R analysis is performed on the revision reports using the CapProSoft™ system. At the point in time when the revision reports are accepted, the revision report is sent to the SED for its response at step (3.2.2.1.). The SED's response to the revision reports is reviewed by the Core Planning Team at step (3.2.2.3). An A/R evaluation is made of the Core Planning Team's review. If the A/R evaluation is unsuccessful, the process returns to step (3.2.1.1). Otherwise, the process continues at step (3.2.3.).

Next, at step (3.2.3), any changes received from a vendor are reviewed by the Core Planning Team. An A/R analysis is performed on the submitted vendor changes. If the A/R is unsuccessful, the process continues at step (3.2.3.1) where it is formally rejected.

Next, at step (3.2.4), the Business Official makes a request for certificate of occupancy reports. The CapProSoft™ system can generate reports which are on the summary level or at a detail level which can be listed by project or by vendor. Reports are also available from the system that are organized on a project by project basis for each school district. An A/R analysis is performed on the certificate of occupancy reports by the Business Official. If the A/R is unsuccessful, the procedure at step 3.2.4 is repeated. Otherwise, the certificate of occupancy is delivered to the SED for its response at step (3.2.4.1). The SED's response to the certificate of occupancy is reviewed by the Core Planning Team at step (3.2.4.2). An A/R analysis is performed on the SED's review of the certificate of occupancy reports. If the A/R is unsuccessful, the process returns to step (3.2.3.1). Otherwise, the process continues at step (3.2.5).

Next, at step (3.2.5), the Business Official requests status reports from the CapProSoft™ system.

Phase IV: Closing Project and Use Request

FIG. 6 is a more detailed flowchart view of the fourth phase of the computerized system and method of the invention, referred to herein as "Closing Project and Use Request". Referring to FIG. 6, the Closing Project and Use Request phase is generally comprised of one stage, a "Performance Management" stage 601. In phase IV, the architect and construction manager have specific tasks and duties to be performed.

4.1 Performance Management Stage

The "Performance Management" stage 601 will be discussed with reference to steps 4.1.1 through 4.1.4

The "Revision and Change Control" stage 505 will be discussed with reference to steps 3.2.1 through 3.2.4.

At step (4.1.1), the architect and construction manager, i.e., A/E, use the CapProSoft™ system to complete checklists (documentation kept locally on file) provided by the State but which do not have to be submitted back to the State.

At step (4.1.2), the A/E are responsible for reviewing the local documentation (checklists) to make sure that all of the items have been implemented. In other words, the A/E ensure that all of the stipulations of the inspection documentation been met. An A/R evaluation is made of the submitted inspection documentation by the Business Official, using the CapProSoft™ system.

At step (4.1.3), the SED receives the inspection documentation and a certificate of occupancy (C.O.O) is issued. An A/R evaluation is made by the business official of the certificate of occupancy (C.O.O) issued by the SED. If it looks satisfactory, then the construction is completed and the building may be occupied.

At step (4.1.4), a Post Substantial Completion form is prepared, the beginning time line for final report generation.

Phase V: Final Report Generation

FIG. 7 is a more detailed flowchart view of the fifth phase of the computerized system and method of the invention, referred to herein as "Final Report Generation".

Referring to FIG. 7, the Final Report Generation phase is generally comprised of two sub-stages, a "Compile" stage 701 and a "Submit" stage 703.

5.1 Compile Stage

The "Compile" stage 701 will be discussed with reference to step 5.1.1. All of the information collected to date is stored within a data repository of the CapProSoft™ system.

5.2 Submit Stage

The "Submit" stage 701 will be discussed with reference to step 5.1.1.3. In the final phase of the Capital Project, the following reports are generated at step (5.2.1.); the Final Inspection Report; at step (5.2.2.); the Final Cost Report; and at step (5.2.3.), the Final Public Report.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

What is claimed is:

1. A system for project tracking of municipal capital projects comprising:
   a networked computer system;
   an input module receiving information;
   a Capital Projects Planning and Reporting Tool ("CPPRT") having
      a practice module;
      a risk management module and;
      a financial management module;
   a Capital Asset Reporting Tool ("CART") including
      a building inventory module storing and tracking space utilization data, building population data, building assessments, five year capital projects plan, and building floor plans;
   a Fixed Asset Planning Reporting Tool ("FAPRT") including a fixed asset module tracking an inventory of all furniture, fixtures and equipment and replacement cost valuation of same;
   a Technology Asset Planning and Reporting Tool ("TAPRT"), including
      a planning and reporting module tracking an inventory of all data systems, computers, software licenses, hardware equipment, cabling and switching for LAN and replacement cost valuation of same;
   Security Asset, Planning, Reporting Tool ("SAPRT"), including a security asset module tracking an inventory of all security systems, hardware equipment, cabling and monitoring devices and replacement cost valuation of same; and
   a report generating module;
   wherein said modules are implemented by software on a networked computer system and wherein said modules are configured to define several stages for implementing each project including a definition stage; and
   wherein during the definition stage the modules are configured for
   updating the system with all project scope definitions, selected cost budgets, and the district's preliminary approval information;
   collecting preliminary budget and scope information from said input module; and forwarding the same to a core planning team including a fiscal advisor, bond counsel, architect, and construction manager who determine a budge and scope data for the project;
   authorizing the project to proceed subject to checks and controls as identified by an official approval checklist;
   forwarding the final version of the scope documentation for verification of compliance with all checklist requirements; and
   establishing a capital projects implementation schedule.

2. The system of claim 1, wherein each project includes a plurality of phases and said input module receives specific inputs from various government agencies and wherein at each phase predetermined inputs are required by said modules from respective agencies before the phase can proceed.

3. The system of claim 1, wherein at least some of the phases include generation of a financial report authorizing predetermined financial actions and wherein said modules cooperate to generate each financial report in accordance with preset rules associated with respective municipal risk management financial policies received through said input module.

4. The system of claim 1 wherein each project includes a project Inception phase with an initiation stage and a definition stage; a preliminary and final plans phase having compile, organize, review and revise steps; a construction period phase including implementation steps, revision and change control steps a closing project and use request phase, including performance management steps; and a final building approval phase, including compile steps, and submit steps, said modules being configured to obtain respective data and generate respective reports for each of said steps including indications of whether a next step is authorized to proceed after a previous step.

5. The system of claim 4 wherein the modules are configured to compile, organize and verify a standard set of forms to cover subjects selected from the group consisting essentially of: (1) Code Compliance, (2) Building Evaluation, (3) Preliminary Final Approval and 4. Final Approval, providing a final approval preparation package, entering procurement policies into the system, and obtaining a building permit.

6. The system of claim 4, wherein during the construction period phase the modules are configured to provide formal bid request documentation, to receive documentation from vendors and to select at least one approved vendor based upon criteria selected from the group consisting essentially of: (1) expiration dates related to work completion, (2) performance standards, (3) early termination, (4) service agreements, (5) payment distribution for contracted services, and (6) vendor history.

7. The system of claim 4, wherein during the construction period phase at least one of said modules provides project histories of related expenses in a central repository.

8. The system of claim 7, wherein said modules are further configured to generate final reports of project financial data including site inspection, activity code compliance assurance information sub-contractor completion final reports, compilation final reports, and submission capital project closeout reports.

9. The system of claim 4, wherein said modules are configured during the closing project and use request phase to examine a vendor history of revisions and changes, information regarding inspections of the finished project facility, and to generate reports for obtaining a certificate of occupancy (CO) package, a report for posting a subcontractor completion document, and compiling a final report package.

10. The system of claim 1, wherein each project includes a project inception phase, wherein during said project inception phase said modules cooperate to review planning documentation received by said input module, including a School District's projected educational and physical plant requirements, socio/economic demographics and an active Five Year-Plan, said modules being configured to a select a corresponding capital project.

11. The system of claim 1, wherein each project includes an initiation stage during which said input module receives legal, insurance, financial impact and project team requirements, wherein said modules use predetermined rules to analyze said requirements and generate reports indicating whether the project can proceed.

12. The system of claim 1, wherein each project includes an initiation stage and a construction phase, during which said modules cooperate to generate preliminary and final plans phase, create reports defining performance documents regarding legal, insurance and project team needs, and a start report authorizing the construction phase.

13. The system of claim 12, wherein said modules cooperate to include in said reports information related to said documents, said modules being configured for collection and compiling into an information package (IPKG) of key district planning documents selected from the group consisting essentially of a 5 Year-Plan, consulting requirements, available vendors, project definitions.

14. The system of claim 1, wherein during the definition stage said modules are further configured to establish a project Construction Implementation Schedule and develop a Cash Flow Schedule for the project.

\* \* \* \* \*